US012428278B2

(12) United States Patent
Lepp et al.

(10) Patent No.: US 12,428,278 B2
(45) Date of Patent: *Sep. 30, 2025

(54) AERIAL LIFT INTERLOCKED WITH FALL-PROTECTION SAFETY APPARATUS

(71) Applicant: 3M INNOVATIVE PROPERTIES COMPANY, St. Paul, MN (US)

(72) Inventors: Jonathan J. Lepp, Eagan, MN (US); Christopher J. Reineke, Forest City, IA (US); Kristin M. Mikes, Forest City, IA (US); Donaldo J. Medeiros, Oakville (CA); Jeffrey T. Keacher, Denver, CO (US); Aline H. Hinkle, Woodbury, MN (US); Christopher M. Higgins, Forest City, IA (US); Heidi A. Lopez-Hidalgo, South St. Paul, MN (US); Tyler B. Henn, Buffalo Center, IA (US); Lauren K. Carlson, St. Paul, MN (US); Michael T. Weiss, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/569,273

(22) PCT Filed: Jun. 22, 2022

(86) PCT No.: PCT/IB2022/055787

§ 371 (c)(1),
(2) Date: Dec. 12, 2023

(87) PCT Pub. No.: WO2023/275675

PCT Pub. Date: Jan. 5, 2023

(65) Prior Publication Data

US 2024/0270554 A1 Aug. 15, 2024

Related U.S. Application Data

(60) Provisional application No. 63/306,548, filed on Feb. 4, 2022, provisional application No. 63/232,388, filed (Continued)

(51) Int. Cl.
*G08B 21/00* (2006.01)
*A62B 35/00* (2006.01)
(Continued)

(52) U.S. Cl.
CPC ........ *B66F 17/003* (2013.01); *A62B 35/0037* (2013.01); *A62B 35/0068* (2013.01);
(Continued)

(58) Field of Classification Search
CPC .... B66F 17/003; B66F 11/046; B66F 17/006; B66F 9/24; B66F 9/127; A62B 35/0037;
(Continued)

(56) References Cited

U.S. PATENT DOCUMENTS 6,265,983 B1 7/2001 Baillargeon
6,297,744 B1 10/2001 Baillargeon et al.
(Continued)

FOREIGN PATENT DOCUMENTS

CA 2880874 7/2014
CA 2930018 A1 11/2016
(Continued)

OTHER PUBLICATIONS

"V-Tec io1 Self-retracting lifeline", V-Tec, 2 pages, [retrieved on the internet on Oct. 28, 2021], URL <https://us.msasafety.com/Fall-Protection/Self-Retracting-Lanyards/V-TEC%C2%AE-io1/p/000460000400011005?locale=en.>, 2pages.
(Continued)

*Primary Examiner* — Mark S Rushing
(74) *Attorney, Agent, or Firm* — Kenneth B. Wood

(57) ABSTRACT

An aerial lift that is interlocked with a fall-protection safety apparatus and may be further interlocked with at least one additional safety apparatus. The aerial lift is equipped with a monitoring system that is configured to detect whether a connector of a safety line of the fall-protection apparatus appears to be connected to a safety harness of a user of the aerial lift.

24 Claims, 5 Drawing Sheets

Related U.S. Application Data on Aug. 12, 2021, provisional application No. 63/217,806, filed on Jul. 2, 2021.

(51) Int. Cl.
*A62B 35/04* (2006.01)
*B66F 11/04* (2006.01)
*B66F 17/00* (2006.01)

(52) U.S. Cl.
CPC .......... *A62B 35/0075* (2013.01); *A62B 35/04* (2013.01); *B66F 11/046* (2013.01); *B66F 17/006* (2013.01); *A62B 35/0093* (2013.01)

(58) Field of Classification Search
CPC . A62B 35/0068; A62B 35/0075; A62B 35/04; A62B 35/0093
USPC ........................................................ 340/573.1
See application file for complete search history.

(56) References Cited

U.S. PATENT DOCUMENTS

| | | | | |
|---|---|---|---|---|
| 6,330,931 | B1 | 12/2001 | Baillargeon et al. | |
| 7,843,349 | B2 | 11/2010 | Rohlf | |
| 8,256,574 | B2 | 9/2012 | Griffiths et al. | |
| 8,430,206 | B2 | 4/2013 | Griffiths et al. | |
| 8,430,207 | B2 | 4/2013 | Griffiths et al. | |
| 9,480,866 | B2 | 11/2016 | Pollard | |
| 9,488,235 | B2 | 11/2016 | Casebolt | |
| 9,776,847 | B2 | 10/2017 | Mondal et al. | |
| 9,993,669 | B2 | 6/2018 | Casebolt et al. | |
| 9,998,804 | B2 | 6/2018 | Awiszus et al. | |
| 10,004,927 | B2 | 6/2018 | Choate et al. | |
| 10,085,520 | B2 | 10/2018 | Moran | |
| 10,138,102 | B2 | 11/2018 | Baillargeon et al. | |
| 10,231,518 | B2 | 3/2019 | Moran | |
| 10,238,184 | B2 | 3/2019 | Moran | |
| 10,496,045 | B2 | 12/2019 | Hu et al. | |
| 10,667,583 | B2 | 6/2020 | Moran | |
| 11,042,129 | B2 | 6/2021 | Moran | |
| 2007/0074935 | A1 | 4/2007 | Zahn | |
| 2010/0231402 | A1 | 9/2010 | Flynt et al. | |
| 2011/0090079 | A1* | 4/2011 | Morino .............. | A62B 35/0075 340/532 |
| 2011/0168486 | A1 | 7/2011 | Dobrovolsky | |
| 2014/0151155 | A1 | 6/2014 | Choate et al. | |
| 2015/0027808 | A1* | 1/2015 | Baillargeon ....... | A62B 35/0025 182/19 |
| 2015/0122579 | A1 | 5/2015 | Vance et al. | |
| 2015/0284231 | A1 | 10/2015 | Grant | |
| 2016/0107007 | A1* | 4/2016 | Pollard .............. | A62B 35/0075 182/3 |
| 2017/0129753 | A1 | 5/2017 | Kraimer et al. | |
| 2017/0372216 | A1 | 12/2017 | Awiszus et al. | |
| 2019/0016768 | A1 | 1/2019 | Chen et al. | |
| 2019/0092613 | A1 | 3/2019 | Baillargeon et al. | |
| 2020/0016439 | A1 | 1/2020 | Perner et al. | |
| 2020/0198952 | A1 | 6/2020 | Lepoutre et al. | |
| 2020/0222732 | A1 | 7/2020 | Rutkowski et al. | |
| 2020/0260824 | A1 | 8/2020 | Moran | |
| 2021/0035428 | A1* | 2/2021 | Baillargeon ........... | G08B 25/10 |
| 2021/0087035 | A1* | 3/2021 | Yip ........................ | G08B 21/02 |
| 2021/0358282 | A1 | 11/2021 | Lin et al. | |
| 2022/0134149 | A1 | 5/2022 | Carlson et al. | |
| 2023/0218934 | A1 | 7/2023 | Carlson et al. | |
| 2024/0033546 | A1 | 2/2024 | Carlson et al. | |

FOREIGN PATENT DOCUMENTS

| | | | |
|---|---|---|---|
| CA | 3013742 | A1 | 2/2019 |
| CN | 210127072 | U | 3/2020 |
| EP | 2314354 | A2 | 4/2011 |
| EP | 3002249 | | 4/2016 |
| EP | 3260172 | A1 | 12/2017 |
| EP | 3339240 | | 6/2018 |
| GB | 2510096 | A | 7/2014 |
| GB | 2481709 | B | 12/2014 |
| JP | 2004018212 | A | 1/2004 |
| JP | 2014129158 | A | 7/2014 |
| KR | 10-1626856 | B1 | 6/2016 |
| WO | 2000019052 | A1 | 4/2000 |
| WO | 2018150299 | A1 | 8/2018 |
| WO | 2018178780 | A2 | 10/2018 |
| WO | 2019025345 | A2 | 2/2019 |
| WO | 2019030708 | A1 | 2/2019 |
| WO | 2019040409 | A1 | 2/2019 |
| WO | 2019157007 | A1 | 8/2019 |
| WO | 2020194121 | A1 | 10/2020 |
| WO | 2021005467 | A1 | 1/2021 |

OTHER PUBLICATIONS

3M™ DBI-SALA Nano-Lok™ Connected Order Picker SRD System, User Instruction 5908581 Rev. F 2021, 40 Pages.

3M™ DBI-SALA Nano-Lok™ Connected Order Picker SRL System, 2021, 7 Pages.

International Search report for PCT International Application No. PCT/IB2020/055787 dated Feb. 2, 2023, 6 pages.

"Piranha Lox Intelligent Interlock System" retrieved from the internet on Mar. 14, 2024 as https://www.piranha-safety.com/wp-content/uploads/2019/05/Piranha-Lox-Declaration-of-Conformity.pdf.

"The Piranha Lox by Piranha Safety" dated Apr. 8, 2018 retrieved at https://www.youtube.com/watch?v=ZmMMZJNTROw.

* cited by examiner

AERIAL LIFT INTERLOCKED WITH FALL-PROTECTION SAFETY APPARATUS

CROSS REFERENCE TO RELATED APPLICATIONS

This application is a national stage filing under 35 U.S.C. 371 of PCT/IB2022/055787, filed 22 Jun. 2022, which claims the benefit of U.S. Provisional Patent Application No. 63/217,806, filed 2 Jul. 2021, U.S. Provisional Patent Application No. 63/232,388, filed 12 Aug. 2021, and U.S. Provisional Patent Application No. 63/306,548, filed 4 Feb. 2022, the disclosures of all of which are incorporated by reference in their entirety herein.

BACKGROUND

Aerial lifts are widely used for a variety of applications. In particular, so-called order pickers are motorized aerial lifts that are widely used for materials handling to pick items from vertical stacks, from shelves of various heights, and so on.

SUMMARY

In broad summary, herein is disclosed an aerial lift that is interlocked with a fall-protection safety apparatus and may be further interlocked with at least one additional safety apparatus. The aerial lift is equipped with a monitoring system that is configured to detect whether a connector of a safety line of the fall-protection safety apparatus appears to be connected to a safety harness of a user of the aerial lift. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
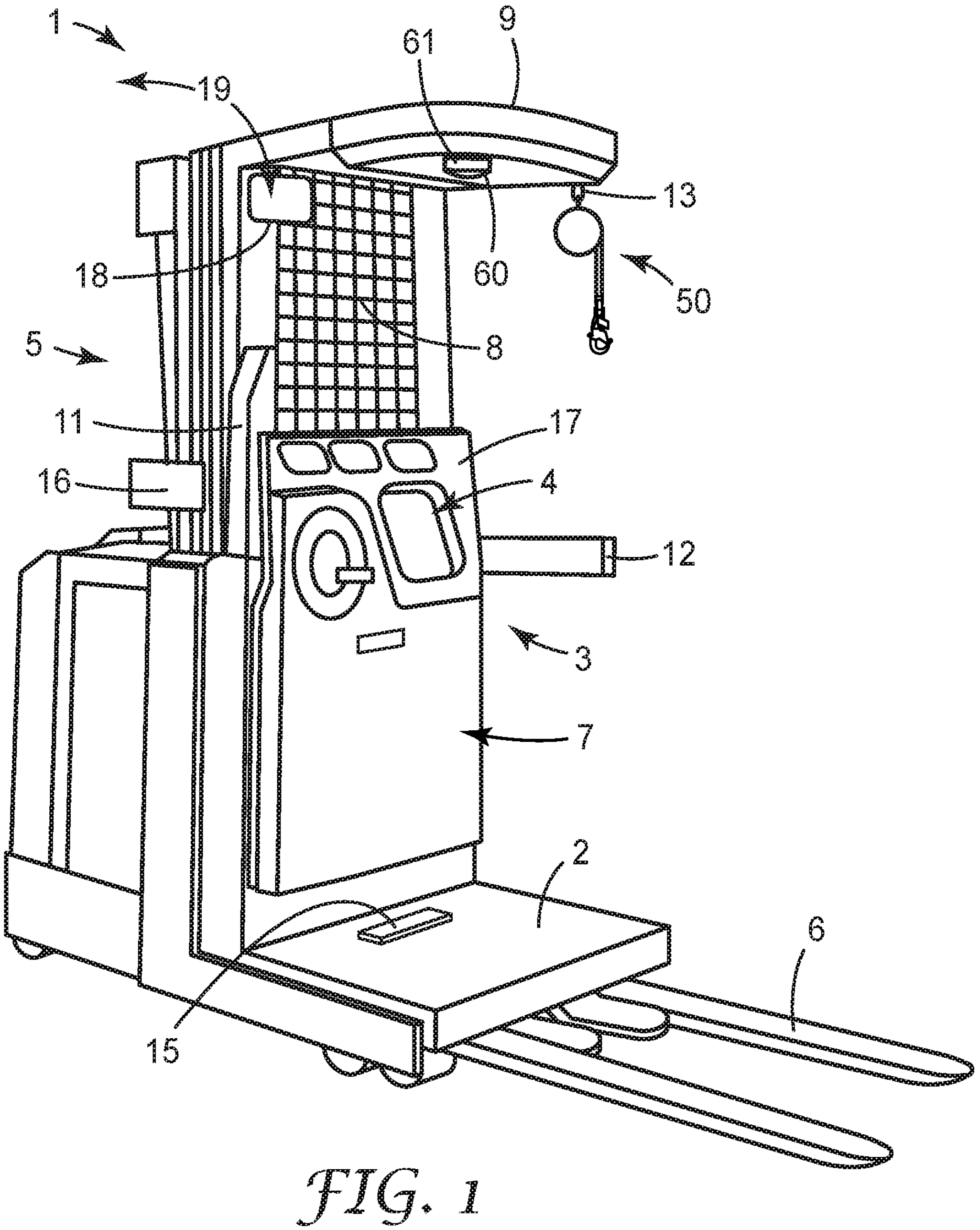
FIG. 1 is a side perspective view of an aerial lift, in exemplary, generic representation, the aerial lift being an order picker equipped with a monitored fall-protection safety apparatus, also shown in exemplary generic representation.

Like reference numbers in the various figures indicate like elements. Some elements may be present in identical or equivalent multiples; in such cases only one or more representative elements may be designated by a reference number but it will be understood that such reference numbers apply to all such identical elements. All figures and drawings in this document are not to scale and are chosen for the purpose of generically illustrating representative embodiments of the invention. In particular the dimensions of the various components are depicted in illustrative terms only, and no relationship between the dimensions of the various components should be inferred from the drawings, unless so indicated. Although terms such as "first", "second", "additional", "primary", "secondary", "tertiary", and so on, are used in this disclosure, it will be understood that those terms are used in their relative sense only unless otherwise noted. Specifically, in regard to the use of such terms to described various signals described herein, it is emphasized that such terms, or combinations of such terms, do not invoke any temporal order unless specifically noted. Terms such as vertical, upward and downward, above and below, and so on, have their ordinary meaning with respect to the Earth's gravity. The horizontal direction likewise has its ordinary meaning as any direction perpendicular to the vertical direction.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Disclosed herein are a fall-protection safety apparatus 50 and a fall-protection monitoring system that can monitor various aspects of the fall-protection safety apparatus, as discussed in detail later herein. Such apparatus and systems can be used with aerial lifts, as exemplified by so-called order pickers; an order picker 1 is shown in exemplary, generic representation in FIG. 1. Order pickers are material-handling vehicles that are widely used to pick items from vertical stacks, from shelves of various heights, and so on. As shown in exemplary embodiment in FIG. 1, an order picker is a motorized vehicle having a generally horizontal platform 2 that supports a human user (operator) of the order picker and that is elevatable to a considerable height as shown in exemplary embodiment in FIG. 2 (noting that the order picker depicted in FIG. 2 differs in various aspects from the order picker depicted in FIG. 1). The operator typically stands on operator-support platform 2, but in some embodiments platform 2 may be provided with a seat, stool or the like. In some embodiments, the order picker includes manual input devices (controls) 4 that allow the operator to operate the order picker, e.g. to steer the order picker, to manually drive the order picker from place to place, to raise and lower the operator-support platform, and so on. Such manual input devices may include e.g. a steering wheel or joystick, a forward-reverse control and a speed control, an elevate/descend control, an "inching" or "jogging" button for slow movement or fine adjustment of the position of the order picker, and so on. In some embodiments, at least some functions (e.g. the horizontal movements) of the aerial lift may be automatically controlled (e.g. remotely controlled or autonomously controlled) rather than being manually controlled by the operator, as discussed later herein.

Figure 2:
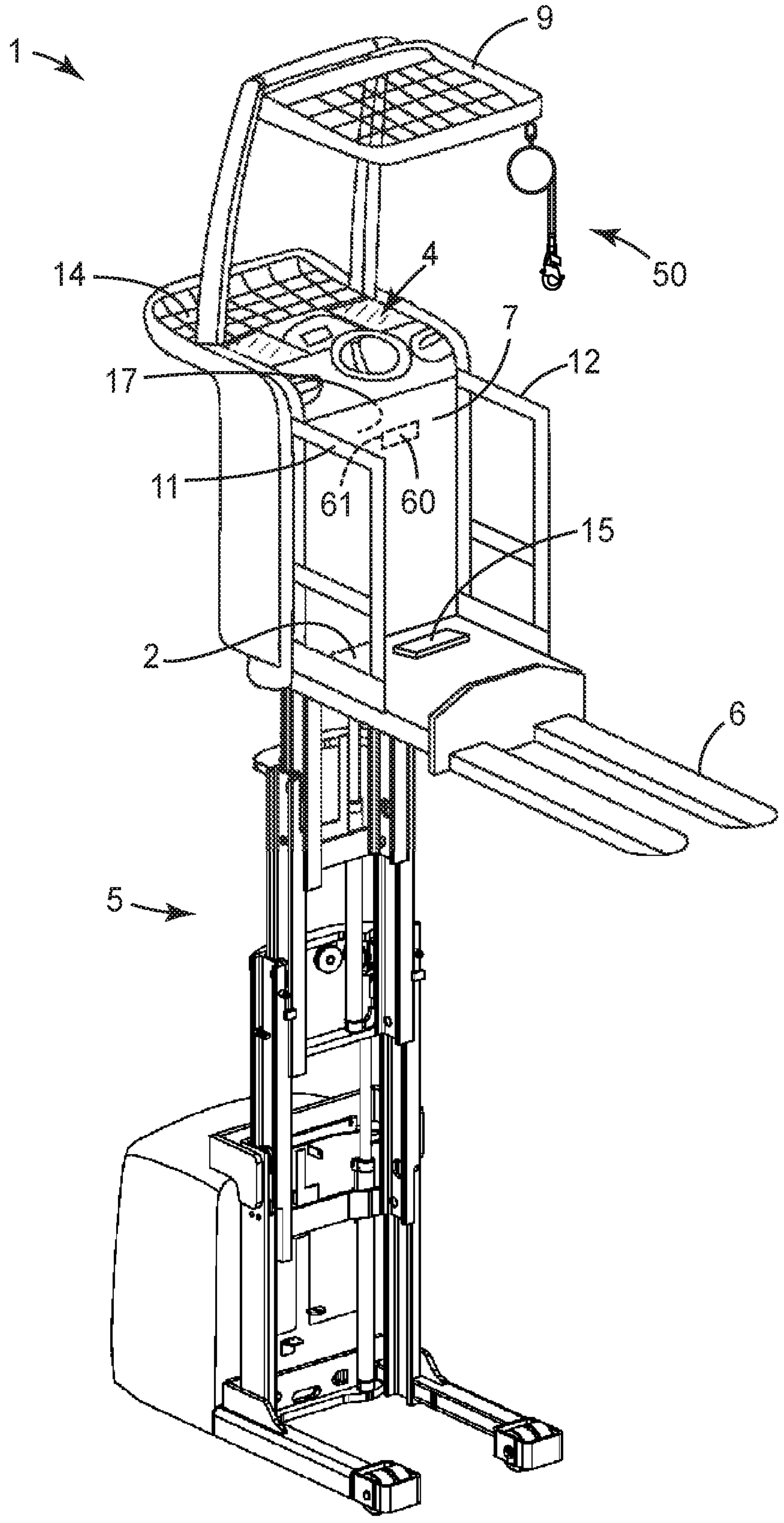
FIG. 2 is a side perspective view of another exemplary order picker, shown in a vertically elevated configuration.

As shown in exemplary embodiment in FIG. 2, an order picker will often comprise a telescoping mast assembly 5 comprising multiple telescoping sections (e.g. two, three or more) that allow platform 2 to be elevated to a considerable vertical height (e.g., 1, 2, 4, 6, 8 or 10 meters or more). Order pickers allow an operator on operator-support platform 2 to be positioned so that the operator can manually grasp one or more items and remove them from an elevated location, e.g. from a shelf or stack. In some instances, the operator may place such items on a tray 14 of the general type shown in FIG. 2. In some embodiments, an order picker will comprise a set of forks 6 that allow larger items to be removed from an elevated location. An order picker (and, an aerial lift in general) thus comprises an operator-support platform 2 that is vertically movable between a first, "lowered" position in which the platform is proximate the ground or floor upon which the order picker resides (and in which condition the order picker may be horizontally moved, e.g. driven), and a second, "elevated" (raised) position. The second, raised position may, at any given time, be any of a plurality of elevated-height positions, e.g. as chosen by the operator in order to reach a particular item. By definition, a second raised or elevated position will be at least 4 inches above the first, lowered position.

In many embodiments, an order picker will comprise a console 7, which may present the above-described controls 4 for use by the operator. Often various electronic components, e.g. control circuitry 17, and so on, as needed to operate the order picker, may be located generally within console 7. In many cases an order picker may comprise a generally vertical wall or panel 8 that rises above the console and that supports a generally horizontal overhead guard (roof) 9. Descriptive terms such as wall, panel, roof, and so on are not meant to limit such entities to purely continuous (e.g. unbroken or uninterrupted) structures. Any such entity may, for example, take the form of e.g. one, two or more beams, columns, or the like (as in the exemplary design of FIG. 2), with at least some empty space provided e.g. so that the user can access a tray 14 if needed. Typically, console 7, panel 8, and overhead guard 9 are in fixed relation to operator-support platform 2 so that these components move vertically in unison with platform 2. In many embodiments at least portions of panel 8 and/or guard 9 may be transparent to enhance the operator's visibility of the horizontal and vertical surroundings. For example, in many embodiments at least a portion of panel 8 may comprise a grid or mesh of widely-spaced wires, as shown in exemplary embodiment in FIG. 1.

Additional Positive Signals

As noted above, an aerial lift, e.g. an order picker, will comprise a fall-protection safety apparatus 50 and a fall-protection monitoring system that monitors the fall-protection safety apparatus. The fall-protection monitoring system will be configured to send, directly or indirectly, at least one first positive signal to the control circuitry of the aerial lift in order for the control circuitry to enable certain functions of the order picker as discussed in detail later herein. Various components of the fall-protection monitoring system may be installed on or in one or more components of the fall-protection safety apparatus and/or may be installed on the aerial lift itself, or integrated into the aerial lift, as discussed in detail later herein.

The aerial lift will comprise at least one safety apparatus in addition to the fall-protection safety apparatus. Any such safety apparatus will be referred to as an "additional" safety apparatus and is monitored so that an "additional" positive signal can be sent to the control circuitry of the aerial lift. Typically, the components of any such additional safety apparatus, and systems for monitoring the status of any such additional safety apparatus, will be installed into or onto the structure of the order picker itself, and will usually be powered by the order picker rather than relying on a separate power source.

One such additional safety apparatus that may be present is an Operator Presence Control (OPC) switch 15 as shown in exemplary embodiment in FIGS. 1 and 2. An OPC switch is a switch that must be engaged in order for at least some functions of the order picker to become enabled, and must be maintained in the engaged condition in order for these functions of the order picker to remain enabled. In some embodiments, the order picker will not move vertically (but may still be able to move horizontally) unless the OPC is engaged. In some embodiments, an order picker will not move horizontally or move vertically unless the OPC switch is engaged (so that the OPC switch is in a "ready" position). This enabling and disabling of various functions of the order picker will be controlled by control circuitry 17 of the order picker, based on signals received from the OPC switch.

An OPC switch (sometimes referred to as a deadman switch, vigilance control switch, or driver presence sensor), serves the purpose of ensuring that the operator of the order picker is present (e.g. is standing on platform 2) and is in active control of the order picker rather than being e.g. incapacitated. When the OPC switch is in a ready position indicative of active control of the aerial lift by the user (operator) of the lift, the OPC switch will send an additional positive (ready) signal to the control circuitry of the order picker; based on this additional positive signal, the control circuitry of the order picker will keep certain functions of the order picker enabled. In the absence of such an additional positive signal, the control circuitry will disable at least some functions of the order picker. An additional positive signal from an OPC switch will be termed a primary additional positive signal to distinguish it from other additional positive signals discussed below. In some embodiments the OPC switch may send such a signal wirelessly; however, in some embodiments it may be convenient that the OPC switch have a wired connection to control circuitry 17 for such purposes.

In some embodiments, an OPC switch 15 may take the form of one or more pedals that can be contacted by the operator's foot e.g. to move the pedal from an upward, disengaged position to a downward, engaged position. The pedal is biased toward the upward, disengaged position, which position is indicative that no active control of the order picker by a human operator is occurring. The downward position is indicative that active control is present, and will cause the primary additional positive signal to be sent to the control circuitry of the order picker indicating that the OPC switch is in a ready condition indicative of active control by a human user. The term "pedal" is used in general to denote any item that is suitably contactable, e.g. pressable, by the operator's foot. Such an item may be e.g. a "button" mounted directly on the floor of platform 2 (as in FIGS. 1 and 2) or may e.g. extend rearward from a lowermost portion of console 7 in the general manner of a piano pedal. Or, such an item may be positioned within a recess at the lowermost portion of console 7, so that the operator is to insert their foot slightly into the recess to reach to the OPC switch. In some embodiments, an OPC switch may be relatively large (or, two OPC pedals or buttons may be provided) so that the operator can shift their position and/or can alternate which foot is used to press the item, in order to enhance the comfort of the operator. In some embodiments (e.g. in which an operator of an aerial lift may occasionally need to face different directions), multiple (e.g. two or three) pedals may be provided, e.g. spaced in an arc around the operator's position, with at least one (in some designs, two) pedals needing to be contacted by a foot of the operator for a primary additional positive signal to be issued.

In other embodiments, an OPC switch may take the form of e.g. a member that must be grasped or squeezed by the user's hand in order to be put into an engaged position. It will thus be understand that an OPC switch may take any suitable physical form and can be in any appropriate location. Whatever the form, in many embodiments any such OPC switch will have a default position (and often will be biased toward that default position) that is a disengaged position and will thus require an operator to actively engage the OPC switch to an engaged position.

In some embodiments, an OPC switch may take the form of e.g. one or more sensors that confirm that an operator's foot has been put into a specific location that confirms that the operator is present and is in active control of the order picker, without the operator necessarily needing to apply pressure with their foot. It is thus noted that an OPC "switch" does not necessarily have to take the form of a physical switch. In fact, in some embodiments one or more cameras and associated image-processing circuitry may be configured to serve as an OPC "switch", as discussed in detail later herein. Thus in summary, an OPC "switch" can take the form of any single item or set of items, functional system, and so on, that individually or collectively verify that the operator is in active control of the order picker.

Another additional safety apparatus of an order picker that may be present is a safety gate apparatus. As shown in exemplary embodiment in FIGS. 1 and 2, such a safety gate apparatus may comprise at least one safety gate. In many embodiments, the safety gate apparatus will comprise first and second (e.g., left and right, from the perspective of FIG. 1) gates 11 and 12 as shown in exemplary embodiment in FIGS. 1 and 2. In some embodiments, at least one such gate will be movable; often, both gates will be movable, between a stowed position and a protective (ready) position (such gates are often referred to as retractable side gates). In a protective position, a gate will be disposed generally above a lateral (left or right) edge of operator-support platform 2 with the two gates combining to laterally flank, e.g. to partially enclose, platform 2 as evident from FIG. 2. In a stowed position, a gate will be in a non-protective position (e.g. pivotally moved upward as with gate 11 of FIG. 1) that, e.g., allows an operator to step onto platform 2 while the order picker is in its first, lowered position.

The term "gate" is used to generally encompass any member, beam, rail, or set of such members that can function in the manner described above. In some embodiments, one or both such gates may be e.g. pivotable about a pivotal connection to order picker 1 so that the gate can be opened (e.g. raised) into a stowed position that allows an operator to step onto platform 2 and can then be closed (e.g. lowered) into a protective position. In some embodiments, the gates may be independently operable so that one may be in a stowed position while the other is in a protective position (e.g. as in the exemplary embodiment of FIG. 1); in other embodiments the gates may operate in unison. In some embodiments, one or both gates may be manually openable and closable e.g. by way of controls located on console 7 of the order picker; in some embodiments, one or both gates may be configured to automatically close or open under certain conditions.

The above-described arrangements are exemplary and that many arrangements of such gates are possible. For example, some such gates, or at least a portion thereof, may pivotally move upward, rather than downward, into a protective (closed) position. Some gates may have one or more portions that move slidably rather than pivotally. In some embodiments, a gate may comprise one or more vertical members, columns or panels (e.g. as in the exemplary arrangement of FIG. 2). In some embodiments one or more such vertical members may e.g. swing downward from an upper rail of the gate (e.g. to contact platform 2) as the gate moves into a closed position; or, such a member may be in fixed relation to a rail of the gate. Any such arrangement of closed gates may border, e.g. may at least partially enclose, the lateral sides of operator-support platform 2. In some embodiments, an additional gate may be provided at or near the rear of platform 2 (e.g. at a location generally opposite console 7). However, in some embodiments this end of platform 2 may be left relatively open so that the operator can easily reach and grasp an item that is to be removed from an elevated location.

A safety gate apparatus may be configured with a sensing system that advises the control circuitry 17 of the order picker whether each gate that is movable is in its stowed position or in its protective position. In particular, when all such movable gates are in a protective (ready) position, the sensing system of the safety gate apparatus will issue at least one additional positive (ready) signal indicating that the safety gate apparatus is in a protective condition. This additional positive signal (or signals) will be termed a "secondary" additional positive signal to distinguish it from the additional positive signal from the OPC switch, which was termed a "primary" additional positive signal (noting again that such terms do not imply that the signals need to be sent, or received, in any particular temporal order.)

Thus in some embodiments, in order for the control circuitry 17 of the order picker to enable certain functions of the order picker and to keep them enabled, the control circuitry will need to receive a secondary additional positive signal from the safety gate apparatus, e.g. in addition to receiving a primary additional positive signal from the OPC switch as described above. In the absence of such a secondary additional positive signal, the control circuitry may disable at least some functions of the order picker. In some embodiments the sensing system of the safety gate apparatus may send such a signal to the control circuitry wirelessly; however, in some embodiments the sensing system of the safety gate apparatus may have a wired connection to the control circuitry of the order picker for such purposes.

Thus in some embodiments an order picker may have two safety apparatus (e.g. an OPC switch and a safety gate apparatus) in addition to the herein-described fall-protection safety apparatus. In such embodiments the control circuitry of the order picker may need to receive at least three positive signals (i.e., at least one first positive signal from the fall-protection monitoring system, a primary additional positive signal from the OPC switch, and a secondary additional positive signal from the safety gate sensing system) to enable certain functions of the order picker.

In some embodiments, the order picker may have one or more additional safety apparatus installed thereon and thus may require one or more additional positive signals from the additional safety apparatus to enable the functions of the order picker. For example, one such additional safety apparatus may be an operator authentication device 16 that (e.g. by scanning an RFID tag, barcode, NFC code or QR code, e.g. of a person's badge) may confirm that the person is trained and authorized to operate the order picker. In other embodiments, such an operator authentication device may take the form of a facial-recognition system, an iris-recognition system, a voice-recognition system, or a keypad or other interface by which the person may need to enter a special code or password. Proper authentication, however achieved, may result in a tertiary additional positive signal being sent to the control circuitry of the order picker. If the order picker is equipped with additional safety apparatus, one or more additional positive signals, e.g. a quaternary additional positive signal, may similarly be sent to the control circuitry.

In various embodiments, any or all of a primary, secondary, tertiary, and quaternary additional positive signal may be sent to the control circuitry of the aerial lift, in addition to the at least one "first" positive signal that will be sent by the fall-protection monitoring system and that is described in detail later herein. Any individual additional positive signal may be used in the absence of any other additional positive signal; moreover, any subset or combination of additional positive signals may be used. It is emphasized again that terms such as primary, secondary, tertiary, and so on, are used for convenience of description only and do not necessarily imply any particular hierarchy or temporal order. For example, in some embodiments, an order picker interlocking system may rely on a tertiary additional positive signal from an operator authentication device regardless of whether the interlocking system also relies on a secondary additional positive signal from a safety gate sensing system. Although discussions herein will mainly concern interlocking of the vertical-motion function of order pickers, it will be understood that an order picker may be configured so that various additional positive signals or combinations thereof may cause different functions to be interlocked. For example, in response to a one additional positive signal, the horizontal-motion function of the order picker may be disabled; in response to a different additional positive signal a maximum horizontal speed of the order picker may be imposed; in response to a different additional positive signal the order picker may be completely immobilized, and so on.

As noted, any of these additional positive signals may be sent to the control circuitry of the order picker wirelessly or via one or more wired connections. Since many of these signals may originate from an entity that is an installed component or subsystem of the order picker itself (e.g. an OPC switch, a sensing system of a safety gate, etc.), in some embodiments the signals may be sent to the control circuitry of the order picker via a wired connection. However, in some embodiments, any such signal or signals may be transmitted wirelessly. In some instances any or all of these signals may be sent continuously. However, this does not necessarily have to be the case; in some instances a primary, secondary tertiary signal, and so on, may be sent intermittently or periodically as long as the transmission frequency is high enough that a change in the state of the safety apparatus will be communicated to the control circuitry sufficiently quickly.

Fall Protection Apparatus

Figure 3:
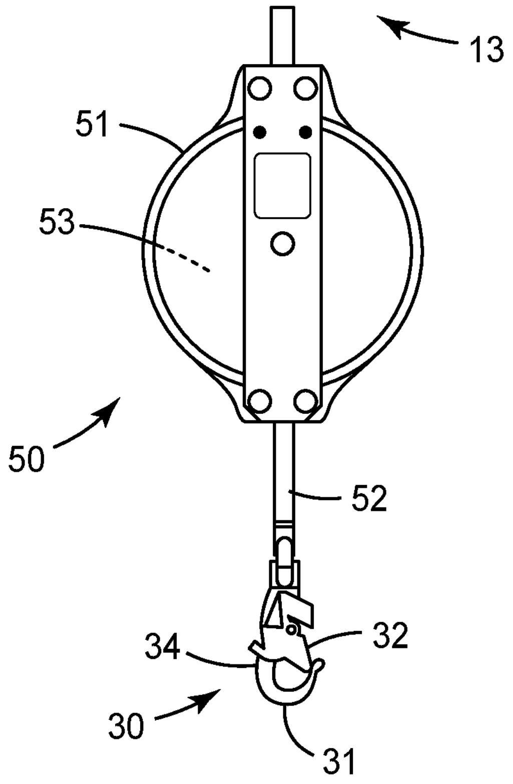
FIG. 3 is a front view of an exemplary fall-protection safety apparatus suitable for use in a fall-protection system of an aerial lift.
Figure 4:
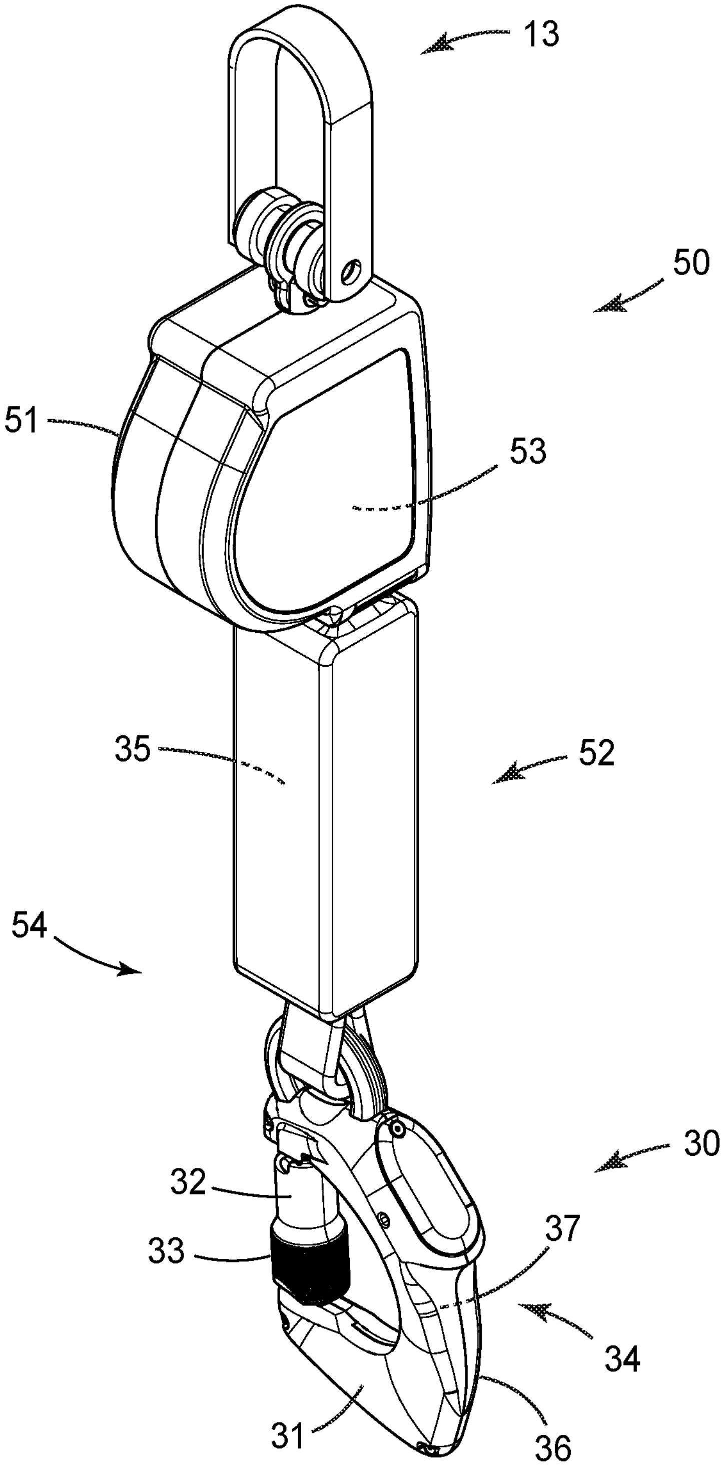
FIG. 4 is a perspective view of another exemplary fall-protection safety apparatus suitable for use in a fall-protection system of an aerial lift.
Figure 5:
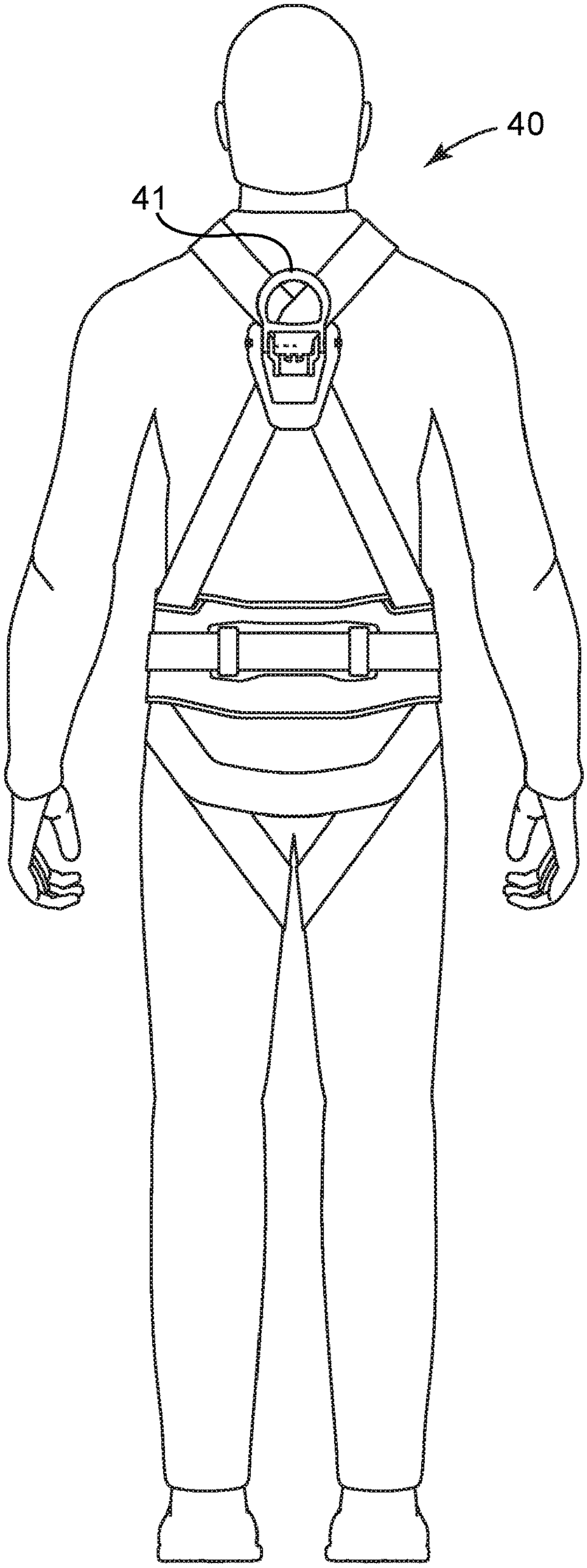
FIG. 5 is a rear view of a fall-protection harness suitable for use in a fall-protection system of an aerial lift.

An aerial lift, e.g. an order picker 1, will be provided with a monitored fall-protection safety apparatus 50 as shown in exemplary embodiment in FIGS. 3 and 4. Such a fall-protection apparatus 50 may be used as part of a fall-protection system that includes a fall-protection safety harness 40 (as shown in exemplary embodiment in FIG. 5) configured to be worn by a human operator of the aerial lift. Fall-protection safety apparatus 50 will comprise a safety line 52 (which may take the form of e.g. a metal cable, a DYNEEMA webbing, and so on), a distal end of the safety line being equipped with a connector 30 configured to be connected to the harness 40. (Other components may be present as well, as will be well understood by artisans in the field.)

A connector 30 may be referred to herein by the generic terminology of "hook" or "gated hook"; however, it will be understood that some such connectors are often referred to as carabiners, with there not necessarily being a firm dividing line between the two. Many such hooks and carabiners (as illustrated in further detail in exemplary embodiment in FIGS. 3 and 4) will comprise a main body 31 and a movable gate 32 and thus will be termed a gated hook. In at least some embodiments, any such connector will be compliant with ANSI standard Z359.12-2019. In some embodiments a connector may be a double-action connector (i.e. with a gate that requires at least two consecutive, different actions to open). One category of double-action connectors are so-called twist-lock hooks and carabiners of the general type exemplified by the product available from 3M Fall Protection under the trade designation KJ5108 HOOK CONNECTOR and various connectors available from 3M Fall Protection under the trade designation SAFLOK. In such connectors, a locking mechanism 33 of gate 32 of connector 30 must be twisted (e.g. at least a quarter turn, around an rotation axis aligned with the long axis of the gate) in order to unlock the gate so that the gate can then be opened. In various embodiments, a locking mechanism 33 may be a collar fitted on a portion of the gate (as in the exemplary arrangement of FIG. 4); or, the entirety of the gate may be twistable. Some connectors (e.g. products available from 3M Fall Protection under the product numbers 2000300 and 2000301) may be triple-action connectors in which the collar and/or gate must be moved slightly along its long axis, in addition to being rotated, to allow the gate to be opened. Another category of double-action connectors are so-called snap hooks (or locking snap hooks) in which a locking mechanism must be moved (e.g. pressed inward or squeezed) before the gate of the hook can be opened. Such connectors include those available from 3M Fall Protection under the products numbers 2007153 and 9510057. All such items will be considered to be connectors as defined herein, and may be referred to generically as gated hooks.

In many embodiments a connector 30 of a safety line 52 may be configured to be connected to a fall-protection safety harness 40 by being attached to a D-ring that is non-removably mounted on the harness. In particular embodiments the connector may be attached to a dorsal D-ring 41 of the general type illustrated in FIG. 5. It is emphasized that the term "D-ring" generically encompasses any item that is attached to a fall-protection harness and that is purposefully configured to have a connector of a safety line attached thereto. Such an item does not necessarily have to exhibit any specific shape; in particular, such an item does not need to be strictly D-shaped. In some embodiments, a connector of a safety line (and the associated "D-ring" of a harness) may be a matched pair of connectors (e.g. one on a safety line and one on a harness; or, on ends of first and second straps, lines or the like) that are specifically configured to be mateable or otherwise engageable with each other but not to be mateable to other types of connectors. In some embodiments such connectors include modular connectors of the general type described in the 3M DBI-Sala Fall Protection Full-Line Catalog 2017 as being supplied as components of Modular Lanyards such as e.g. the EZ-STOP MODULAR LANYARD. Such connectors may, for example, comprise a female connector with a generally T-shaped slot configured to accept a generally T-shaped bar of the other, male connector. In many embodiments, such connectors may be lockable when engaged so that they cannot be disengaged from each other without a prior, purposeful manipulation that places them into an unlocked condition in which they can be disengaged from each other. In some embodiments, such connectors include so-called quick connectors of the general type supplied as a component of e.g. the 3M DBI-SALA NANO-LOK Self-Retracting Lifeline, quick-connect buckles of the general type supplied as a component of e.g. the 3M DBI-SALA EXOFIT STRATA Harness, and the like.

In many embodiments, a fall-protection safety apparatus 50 that is monitored as described herein may be a so-called self-retracting lifeline ("SRL") as shown in exemplary embodiment in FIGS. 3-4. Ordinary artisans will understand that a self-retracting lifeline comprises a load-bearing safety line ("lifeline") 52 that can be unwound from a housing 51 which may be secured to an anchorage 13 located e.g. on an overhead guard or ("roof") 9 of the aerial lift. A distal end of safety line 52 is connectable, e.g. by way of a connector (e.g. a gated hook) 30, to a D-ring 41 of a harness 40. In some embodiments, the connector 30 may be connected to the distal end of safety line 52 by a rotatable connection (e.g. a swivel) so that connector 30 can rotate as necessary due to movements of the operator without causing the safety line 52 to become twisted.

SRL housing 51 comprises a reel (drum) 53 (indicated generically in FIG. 3) that is rotatably connected to housing 51, with a proximal end of safety line 52 being attached to reel 53. Safety line 52 can be unwound from reel 53 and thus extended from housing 51 to follow a user as the user moves about, with reel 53 being biased so that the reel retracts safety line 52 back into housing 51 and rewinds it onto reel 53 as the user moves toward housing 51. In some embodiments at least a lower portion of the housing 51 of an SRL may be covered by a soft cover; for example, in some embodiments substantially the entirety of housing 51 may be contained e.g. within a padded canvas cover that comprises a lower opening to allow safety line 52 to pass therethrough and an upper opening to allow the housing to be secured to an anchorage. The term anchorage as applied to an aerial lift denotes any item that is attached (directly or indirectly) to the aerial lift so that a connector of a fall-protection safety line can be attached thereto, as well as any component of the aerial lift (e.g. a metal strut or beam) that is in itself suitable for attaching a connector of a safety line thereto.

An SRL (e.g. housing 51 and reel 53 thereof) will typically include a brake, e.g. comprising centrifugally-activated pawls that act in cooperation with a ratchet ring. Such a brake will be activated in the event of a user fall (e.g. upon rapid unwinding of safety line 52 from reel 53) to safely bring the user to a halt. In some embodiments a ratchet ring may be fixed in position (e.g., fixed to housing 51). In other embodiments an SRL may comprise a ratchet ring that can rotate at least somewhat if a centrifugally-activated pawl comes into contact with a tooth of the ratchet ring; in such a case the brake will often include one or more pads of frictional material that gradually stop the rotation of the ratchet ring.

In some embodiments, an SRL may comprise a safety line 52 that is equipped with an energy absorber 35 as shown in exemplary embodiment in FIG. 4. In some embodiments, an energy absorber 35 may take the form of a so-called shock-pack or tear-strip. Such energy absorbers often rely on two or more segments of line, e.g. webbing, that are fastened (e.g. by stitching) to each other. Such segments may be folded into an accordionized (z-folded) arrangement, with the segments and fasteners being arranged so that in response to a sufficient force (e.g. in the event of a fall), the fasteners will give way so that the segments separate (e.g. "unzip" and/or unfold) from each other in a manner that absorbs energy to safely bring the user to a more gradual halt than would otherwise occur in the absence of the energy absorber. Such energy absorbers are often used in SRLs that have a fixed ratchet ring and that do not include the above-described pads of frictional material; however, an energy absorber may be used in an SRL of any design.

Fall-protection safety apparatus such as self-retracting lifelines and components and functioning thereof are described in various aspects in U.S. Pat. Nos. 7,843,349, 8,256,574, 8,430,206, 8,430,207, and 9,488,235. In some embodiments an SRL may be a so-called "personal" SRL that is used in a slightly different manner than described above. Nevertheless, the arrangements disclosed herein can be used with such an SRL, as discussed in detail later herein. In some embodiments a self-retracting lifeline will meet the requirements of ANSI Z359.14-2014. Any such fall-protection apparatus may be configured to allow an operator of an aerial lift (e.g. an order picker) to perform actions as needed while the operator-support platform of the aerial lift is in an elevated condition. For example, the operator will be able to operate the aerial lift controls, to reach for and retrieve an item on an elevated shelf proximate the elevated platform of the lift, and so on. A fall-protection apparatus in the form of an SRL may further provide that the operator can move about for short distances as needed while remaining connected to the safety line (e.g. can momentarily step off the platform of the aerial lift when the aerial lift is in its "lowered" position), to the extent that any such actions are permitted by the work facility at which the aerial lift is used.

Fall Protection Monitoring System

An aerial lift as disclosed herein will comprise a fall-protection monitoring system configured to monitor one or more aspects of the fall-protection safety apparatus 50. Such a monitoring system will be configured at least to determine at least whether the connector 30 of the safety line 52 of the fall-protection safety apparatus appears to be connected to a fall-protection safety harness 40 (e.g. to a D-ring 41 of the safety harness) worn by a user of the aerial lift 1 with which the fall-protection apparatus 50 is used. The fall-protection safety apparatus 50 and the fall-protection safety harness 40 may thus combine to form a fall-protection system. However, these items need not stay together at the aerial lift at all times; for example, a fall-protection apparatus such as an SRL may be resident on the aerial lift and remain with the aerial lift, while a safety harness may be worn by the operator even while the operator is disconnected from the SRL and is away from the aerial lift.

Interlocking and First Positive Signals

A fall-protection monitoring system for a fall-protection safety apparatus may, in some embodiments, comprise at least one sensor module and at least one base unit, as discussed in detail later herein. Any such fall-protection monitoring system will be configured so that if the monitoring system determines that the connector appears to be connected to the safety harness, the fall-protection monitoring system will issue at least one positive signal that can be received, directly or indirectly, by the control circuitry of the aerial lift. A positive signal that is issued by the fall-protection monitoring system of the fall-protection apparatus indicating that the connector appears to be connected to the safety harness (and thus that, at least in this particular aspect, the fall-protection apparatus appears to be in a ready condition), will be termed a "first" positive signal to distinguish it from the "additional" positive signals described previously (e.g. a primary additional positive signal issued by an OPC switch of the aerial lift, a secondary additional positive signal issued by a safety gate apparatus of the aerial lift, a tertiary additional positive signal issued by an authorization safety apparatus of the aerial lift, and so on).

As disclosed herein, an aerial lift 1 is interlocked with the fall-protection safety apparatus 50 and with at least one additional safety apparatus of the aerial lift. By this is meant that in order for at least the vertical-motion function of the aerial lift to be enabled, the control circuitry of the aerial lift must receive at least one first positive signal from the fall-protection monitoring system indicating at least that the connector of the safety line appears to be connected to the safety harness of the user (that is, that the fall-protection apparatus is in a ready condition); and, the control circuitry of the aerial lift must receive at least one additional positive signal from at least one additional safety apparatus of the aerial lift indicating that the at least one additional safety apparatus is in a ready condition. The control circuitry must continue to receive the at least one first positive signal, and the at least one additional positive signal, for at least the vertical-motion function of the aerial lift to remain enabled.

In some embodiments, the only additional positive signal that the control circuitry needs to receive in order to enable at least the vertical-motion function of the aerial lift, is a signal from the OPC switch. In other embodiments, the control circuitry may need to receive a primary additional positive signal from the OPC switch and to receive a secondary additional positive signal from a safety gate apparatus, to enable at least the vertical-motion function. In still other embodiments, the control circuitry may need to receive either or both of these additional positive signals along with a tertiary additional positive signal from an operator authentication device, to enable at least the vertical-motion function. Any combination of these additional positive signals (whether totaling to one, two, three, four, or more additional positive signals) may be used, with the caveat that at least one first positive signal, from the monitoring system that monitors the fall-protection safety apparatus, will always be required along with whatever additional positive signals are needed.

In some embodiments, a fall-protection monitoring system may be configured to issue a negative signal that indicates that the fall-protection apparatus is not in a condition in which the aerial lift can be elevated, e.g. if the connector of the apparatus has been detected as not being connected to the operator's harness. Such a negative signal, when received by the control circuitry of the order picker, will cause the control circuitry to disable at least the vertical-motion function of the order picker. However, in many embodiments, the interlocking arrangements disclosed herein may operate based only on the presence or absence of one or more first positive signals rather than on the sending of any explicitly negative signal. That is, in some embodiments, the control circuitry of the aerial lift may take action (or, strictly speaking, may prevent action such as elevation from occurring) based merely on the absence of a first positive signal. In other words, rather than issuing a negative signal if the connector of the fall-protection apparatus appears to no longer be connected to the harness of the user of the aerial lift, the fall-protection monitoring system can simply cease to issue a first positive signal or signals, as later disclosures herein will make clear.

As disclosed herein, the fall-protection monitoring system will need to transmit at least one first positive signal to the aerial lift for the vertical-motion function of the aerial lift to be enabled. After the vertical-motion function becomes enabled, the fall-protection monitoring system will need to continue to transmit the at least one first positive signal (whether intermittently at a sufficiently high frequency, or continuously), and the aerial lift will need to continue to receive the at least one first positive signal in order to keep the vertical-motion function enabled. The herein-described interlocking of an aerial lift with a fall-protection monitoring system thus applies not merely to start-up and initial movement and use of the aerial lift, but will also apply to subsequent operation of the aerial lift for as long as this may continue.

In some embodiments, an aerial lift may be configured so that the vertical-motion function of the aerial lift is not enabled in the absence of the above-discussed positive signal(s), in a substantially absolute manner. By this is meant that the operator-support platform lift cannot be elevated from a first, lowered position (which is typically the lowest position to which the platform can be lowered and is the position that allows the operator to step onto the platform), to an aforementioned second, elevated position, in the absence of a first positive signal from the fall-protection monitoring system. In other words, such an aerial lift will be substantially unable to elevate any significant amount unless the fall-protection monitoring system reports that the operator appears to be connected to the fall-protection apparatus.

However, in some embodiments, it may be permissible, or even advantageous, for an aerial lift to operate in a mode in which a predetermined, limited amount of vertical elevation is allowable in the absence of the aforementioned positive signal(s). In other words, in some embodiments it may be possible to elevate the operator-support platform to a maximum height of e.g. 1.0, 1.5, 2.0, 3.0, 3.5, or 3.9 feet (e.g., less than or equal to 4.0 feet) relative to the first, lowered position) even if the fall-protection monitoring system has not reported that the operator appears to be connected to the fall-protection apparatus. Such a mode may allow at least some limited use of the aerial lift without the operator being connected to the fall-protection apparatus. In some embodiments, such a maximum height may be preset and unchangeable for a given order picker; in other embodiments, such a maximum height may be set by an authorized person in a facility in which the order picker is used.

It is thus emphasized that the concept of enabling a vertical-motion function of an aerial lift upon receiving at least one first positive signal as disclosed herein does not encompass only cases in which substantially no vertical elevation is possible in the absence of the first positive signal(s). Rather, such terminology also encompasses cases in which the enabling of the vertical-motion function enables vertical elevation of the operator-support platform beyond a predetermined, limited height (e.g., of 1-4 feet) that is allowed even in the absence of the positive signals. However, it is emphasized that an order picker (and any aerial lift, in general) may only be used in this manner, and any such maximum height set, if this is allowed by all laws, rules, codes, standards, and so on that are applicable in the facility and jurisdiction in which the order picker is used.

In some embodiments, the condition that the vertical-motion function of the aerial lift is not enabled, will mean that the aerial lift is not able to elevate upward, nor to descend downward. However, in some embodiments, the condition that the vertical-motion function of the aerial lift is not enabled, means only that the lift cannot elevate upward. In such embodiments, the aerial lift will be able to descend even in the absence of the first positive signal(s) that is/are required in order for ascent to be enabled. In at least some embodiments, this mode of operation (e.g. where descent is always allowed, regardless of signals received or not received from the fall-protection monitoring system) may be preferred. In view of this, it is stipulated that references herein to vertical motion, vertical-motion function, and similar terminology, refer to at least elevation upward, and optionally, but not necessarily, to descent downward.

In some embodiments, only the vertical-motion function of the aerial lift may be enabled and disabled according to the control circuitry of the aerial lift receiving, or not receiving, the first positive signal(s) from the fall-protection monitoring system. That is, in some embodiments the aerial lift may still be able to move horizontally regardless of the signals issued by the fall-protection monitoring system (and/or by the at least one additional safety apparatus). In other embodiments, both the vertical-motion function and the horizontal-motion function of the aerial lift may be enabled and disabled in the manner described above. In such embodiments, the aerial lift may be unable to move at all, in any direction, unless the first positive signal(s) is received by the control circuitry of the aerial lift. In many embodiments, the status of one or more of the above-described additional safety apparatus may have an effect on the functioning of the aerial lift that, in some circumstances, is independent of the signals issued by the fall-protection monitoring system. Thus for example, even if an aerial lift might be able to move horizontally in the absence of a first positive signal from the fall-protection monitoring system, the aerial lift may nevertheless need to receive e.g. a tertiary positive signal confirming that a person is and authorized user of the aerial lift, in order for the aerial lift to move horizontally.

As noted earlier herein, an aerial lift (e.g. an order picker) will typically comprise a console 7 bearing various input devices 4 that are contacted (e.g., grasped) by a user of the aerial lift and are manipulated to manually control the operation (e.g., vertical and horizontal movement) of the aerial lift. Such manual control input devices may take the form of e.g. one or more wheels, levers, joysticks, yokes, knobs, buttons, and so on, and may be manipulated e.g. by pushing, pulling, rotating, twisting, tilting, touching, and so on. When a vertical-motion function of the aerial lift is disabled as described above, the particular manual control input device or devices that is normally manipulated to cause the lift to perform the vertical motion, will be locked-out so as to be unresponsive when manipulated by the user in an attempt to input a command for movement. When the vertical-motion function is enabled, the device or devices will be responsive to attempted input by the user. Similarly, if an aerial lift is configured so that a horizontal-motion function of the aerial lift is disabled in addition to the disabling of the vertical-motion function, the manual control input device or devices that are normally manipulated to cause the lift to perform the horizontal motion, will be locked out so as to be unresponsive. When the horizontal-motion function is enabled, the device or devices will be responsive.

In the case of an aerial lift (e.g. an order picker) at least some of whose movements and functions are automatically and/or remotely controlled, the herein-disclosed interlocking may be applied to actions taken, or not permitted to be taken, by the aerial lift when under automatic control, as discussed in detail later herein. In such a case, the interlocking may also include measures to prevent a user from manipulating manual controls in a way that would overcome the automatic control. In other words, if an interlocked, automatically-controlled aerial lift is e.g. prevented from elevating, the interlocking arrangement can include the disabling of manual controls so that the operator of the aerial lift cannot override the prohibition against elevating the aerial lift by the application of manual control.

In various embodiments, communications between the fall-protection monitoring system (e.g. a base unit thereof) and the control circuitry of the aerial lift may be one-way or two-way (such communication may also be direct or indirect; and by wired or wireless means, all as discussed in detail later herein). If the communication is one-way, it will flow from the monitoring system to the aerial lift. That is, in such embodiments the control circuitry of the aerial lift will be configured to receive and act upon information received from the base unit of the fall-protection monitoring system; however, the base unit of the monitoring system will not be configured to receive and act upon information received from the control circuitry of the lift. If the communication is two-way, the control circuitry will have the above functionality, and the base unit will be configured to receive, and act upon, information received from the control circuitry. In some embodiments, a base unit may be configured with a galvanically isolated interface through which to receive a signal (e.g. in the form of a constant voltage) from the control circuitry and then to return the signal to the control circuitry, with both of these being performed while maintaining galvanic isolation between the control circuitry and the base unit as described in detail later herein. Such an arrangement, in and of itself, will not be considered to necessarily comprise two-way communication as described above.

In some embodiments, two-way communication can provide that the control circuitry of the aerial lift can send the fall-protection monitoring system information regarding the vertical elevation of the operator-support platform of the aerial lift. In other words, the control circuitry can keep track of the height to which the platform has been raised and can pass this information along to the fall-protection monitoring system, which may be useful in some circumstances. For example, the fall-protection monitoring system can be configured so that if the fall-protection monitoring system determines that the connector of the safety line appears to have become disconnected from the safety harness of the user while the operator-support platform is in a vertically-elevated condition, the fall-protection monitoring system may broadcast an unhooked-while-elevated warning notification. (The general topic of notifications that may be broadcast by a fall-protection monitoring system and/or by the control circuitry of an aerial lift, is discussed in detail later herein.) Such a warning notification may take any suitable form and may have a particular form that distinguishes it from other notifications. For example, in comparison to some other notifications, it may comprise a louder or more strident audible signal, a visual signal that is brighter, flashing more quickly, and/or of a different color, a particularly noticeable haptic sensation, and so on. If the warning notification includes verbiage, it may take any suitable form (and does not have to necessarily take the form of the exact phrase “Unhooked While Elevated”).

A platform-elevation height that is necessary to trigger such a warning notification may be any suitable value, e.g. 1.0, 2.0, 3.0, 4.0, 5.0, or 6.0 feet or greater (noting that these and other heights disclosed herein are relative to the first, lowered position of the platform). Such a height may be preset in manufacture of the aerial lift and/or of the fall-protection apparatus (and thus may be unchangeable); or, in some embodiments it may be programmable or customizable by an authorized person in the facility in which the aerial lift is used.

As disclosed herein, an aerial lift may be configured so that the absence or ceasing of at least one first positive signal from a fall-protection monitoring system will cause the at least the vertical-motion function (and in some cases the horizontal-motion function as well) of the aerial lift to be disabled. In some embodiments, it may be useful to allow for a privileged mode of operation in which, for example, the restrictions on horizontal motion can be overridden but in which restrictions on vertical motion can be maintained. Such a mode may be useful in situations where the ability of the aerial lift to propel itself horizontally under its own power may be advantageous (e.g. so that the aerial lift does not have to be lifted and carried by a forklift), but in which it is not needed or desired to elevate the aerial lift. Such a situation may arise e.g. when an aerial lift is being initially rolled off the production line, is being self-conveyed into an end-use facility after having being unloaded from a delivery truck, is undergoing maintenance, and so on. (It is thus envisioned that the need for such a mode of operation will only arise occasionally.)

To provide for such eventualities, in some embodiments the control circuitry of the aerial lift can be configured so that one or more predetermined conditions are met, the control circuitry will allow a privileged mode of operation. When such a mode is entered, at least the one or more manual control input devices that control horizontal motion of the aerial lift are activated to a state in which they are responsive to control inputs regardless of whether any first positive signal is issued by the fall-protection system. Typically, the restrictions applied by the additional safety apparatus of the aerial lift will remain in place; e.g. the aerial lift will not be able to be moved horizontally unless the OPC switch is engaged and the safety gate apparatus is in a ready condition.

A predetermined condition that must be met to allow such a mode of operation can be anything that confirms that a particular user of a particular aerial lift is authorized to operate the aerial lift in privileged mode. Such a predetermined condition may take the form of e.g. a user entering a special password or code into a keypad of the aerial lift or a base unit of the fall-protection monitoring system, may take the form of a user having a special badge that, e.g. upon being read by the aerial lift or the base unit, authorizes the privileged mode, and so on. Any arrangement of this general type may be used. In some such embodiments, during any such privileged mode, one or more notifications may be broadcast (e.g. in the form of special audible or visual signals) that signify that the aerial lift is currently being operated in privileged mode.

In a special case of this arrangement, in some embodiments an aerial lift may be configured so that under certain conditions it can be operated in a special-privilege mode in which both horizontal and vertically-upward movements of the order picker are allowed regardless of whether any first positive signal is issued by the fall-protection system. It is envisioned that operation in such a mode would likely be allowed only under very particular circumstances, and would e.g. be subject to enhanced operator-identification and/or authorization procedures.

In ordinary use of many aerial lifts (e.g. order pickers), only a single user/operator will be present. e.g. standing on the operator-support platform. However, in some embodiments, multiple (e.g. two or more) persons may be present. This may occur, for example, when a person is being trained to operate an aerial lift, or if the aerial lift is being used for a procedure that involves two or more persons. To allow for such eventualities, in some embodiments an aerial lift may comprise a "multi-user" operating mode in which the control circuitry is required to receive (at least) two first positive signals, one confirming that a connector is connected to the harness of a first user (e.g. a "trainer"), and another confirming that a second, separate connector is connected to the harness of a second user (e.g. a "trainee"), to enable the vertical-motion function of the aerial lift.

In some embodiments, a chosen aerial lift may be equipped with two fall-protection safety apparatus that are permanently resident on the aerial lift, e.g. to serve as a "trainer" lift. In some embodiments, a "mobile" fall-protection safety apparatus may be configured so that it can be installed for a desired time on an aerial lift that already has a "resident" fall-protection apparatus. In various embodiments, a fall-protection monitoring system may be configured so that it can monitor both such fall-protection apparatus; or, two separate monitoring systems can be used. Whatever the arrangement, the aerial lift will be configured such that when the aerial lift is in a "multi-user" mode, the control circuitry of the aerial lift must receive at least a first positive signal indicating that the connector of the first fall-protection apparatus appears to be connected to the harness of a first user, and must also receive another first positive signal indicating that the connector of the second fall-protection apparatus appears to be connected to the harness of a second user. Only upon receipt of both first positive signals (along with any other additional positive signal of the types discussed earlier herein) will the vertical-motion function of the aerial lift be enabled.

In some instances, an aerial lift may be able to detect (e.g. via a camera-based sensing system as described later) that two (or more) persons are present on the operator-support platform of an aerial lift, and to provide this information to the operating circuitry of the aerial lift so that the aerial lift will accordingly enter a "multi-user" mode. An aerial lift can also be configured so that a user can enter a command for the aerial lift to enter a multi-user mode.

Automatic/Remote Control and Telemetry

Although discussions so far have focused primarily on manual control of an aerial lift (e.g. an order picker), in some embodiments the arrangements disclosed herein may be used with an aerial lift whose movements are guided at least in part by automatic and/or remotely applied control rather than by manual inputs of a human user. Such an aerial lift may, for example, follow designated paths in a warehouse, with the horizontal movements of the aerial lift being directed by a central station that plans and directs the horizontal travel of many such aerial lifts. Such guided horizontal movements of a lift may be facilitated by an automatic control system comprising e.g. any suitable combination of tracking indicia (e.g. RFID tags) provided on the floor of the warehouse; guidewires embedded in the floor of the warehouse; floor-mounted physical rails followed by guide rollers on the aerial lift; cameras operating in conjunction with computer-vision software; radar/lidar sensors; global-positioning system (GPS) tracking; geofencing that defines multiple geofenced zones within the facility; logic circuits within the control circuitry of the aerial lift; and so on, e.g. in combination with orders issued by a central monitoring/directing station.

Upon arriving or nearing arrival at a destination, a user may manually elevate the aerial lift as needed; or, in some embodiments, the automatic control system may initiate and control the elevating of the lift, subject to the constraints imposed by the fall-protection monitoring system. The arrangements disclosed herein may be used in such circumstances e.g. by configuring the control circuitry of the aerial lift so that unless the control circuitry receives at least one first positive signal from the fall-protection monitoring system, the vertical-elevating function of the aerial lift will be disabled so that it cannot be elevated in response to manual inputs or in response to inputs received from an automatic control system. In some such embodiments the disabling may occur at least in part in the guise of decisions made by logic circuits within the control circuitry of the aerial lift (e.g., a decision to not elevate the aerial lift) rather than by any actual disabling of manual input devices that would be used by a human operator to control the aerial lift. (However, as noted earlier, in such cases manual input devices may also be disabled as a further protective measure.) In some scenarios such decisions might be made by logic circuits located at a central directing station with the decisions being transmitted to the aerial lift; however, in many instances it may be convenient for such decisions to be made on-board the aerial lift itself.) All such scenarios are encompassed within the arrangements disclosed herein.

The above discussion of aerial lifts that are controlled at least in part from a remote location, e.g. from a central directing station, is one case of a general arrangement in which one or more aerial lifts is monitored via telemetry. That is, in some embodiments, an aerial lift may be a monitored unit of a telemetry system 19. (In many instances, most or all of the aerial lifts in a given facility may be telemetrically monitored, as a fleet.) In various arrangements, an aerial lift may be telemetrically monitored regardless of whether the aerial lift is partly or fully remote-controlled or is purely manually controlled. In other words, even if an aerial lift is manually controlled, it may still be telemetrically monitored to track parameters and conditions such as e.g. location, destination, horizontal speed, vertical height, battery status, items currently being transported by the lift, the identity of the person currently operating the lift, and so on. In some embodiments, the necessary equipment for such monitoring may be installed on, e.g. integrated into, the aerial lift as manufactured. In some embodiments, some or all such equipment may be added (e.g. as an optional add-on, depending on the user's preference). In some embodiments, such a system may perform only monitoring of the aerial lift, e.g. so that the only flow of status information is from the aerial lift to a central monitoring station. In other embodiments, information may flow both ways, e.g. so that the operator of the aerial lift can receive information such as e.g. the current destination and/or item to be acquired at the destination. In some embodiments, such information may be displayed on a screen for the operator (whether the screen is e.g. built in to the console of the aerial lift, or is an add-on screen that e.g. is suspended from an overhead guard of the aerial lift). In some embodiments, the aerial lift may comprise a so-called mobile data terminal 18 or mobile digital computer, which may display information for the operator, and may also comprise an interface (e.g. a touch-screen or keyboard) that allows the operator to enter information for transmission to a central monitoring station. In some embodiments, at least some of the information that flows through this type of telemetry system (including information from one or more aerial lifts, and/or information transmitted to one or more aerial lifts) may be transmitted to a portable item (e.g., an app that is resident on a general-purpose smartphone, or a dedicated electronic transceiver used only for this purpose) borne e.g. by an authorized person. (This may be done in addition to, or instead of, sending the information to a central monitoring station.)

Thus in some embodiments, the arrangements disclosed herein may be used e.g. in a highly automated facility such as a distribution center that utilizes a so-called warehouse management system that governs many or all aspects of the tasks for which a centrally-directed fleet of fall-protected aerial lifts is used. Such a system may choose and optimize the horizontal travel paths of some or all of the individual aerial lifts, may establish the appropriate workflow strategy (e.g. piece picking, batch picking or zone picking), may subject the aerial lifts to specific workflow and travel optimizations (sometimes referred to as zoning and positioning functions), and so on. In such environments, the information received from the fall-protection monitoring system regarding the status of the fall-protection apparatus will be one more parameter that the control circuitry of each aerial lift takes into account and/or that a central monitoring and/or directing station of the facility takes into account for each aerial lift, to be used in combination with all the other parameters that are needed for partial or full automatic control of the aerial lift(s).

In some embodiments, a fall-protection monitoring system as disclosed herein may send data (e.g. status information on the fall-protection monitoring system itself) to an entity or system (e.g. a portal, website, or central monitoring station) that is dedicated purely to tracking the status of one or more fall-protection monitoring systems, and that functions independently of any telemetry system that may track other aspects of aerial lifts with which the fall-protection monitoring systems are used. However, in some embodiments, at least some of the fall-protection monitoring system status information that is sent to such a dedicated system, may also be communicated or echoed to another entity, e.g. a telemetry system, a portal, a website, an app that is resident on a smartphone of an authorized person, and so on.

The option of monitoring via telemetry offers another means for a herein-disclosed fall-protection monitoring system to communicate the various herein-disclosed signals to an aerial lift so that the desired interlocking of the aerial lift with the fall-protection monitoring system can be achieved. That is, rather than such signals being transmitted from the monitoring system to the aerial lift directly, e.g. by a wired connection or by a short-range wireless mechanism (both as discussed in detail later herein), in some embodiments the fall-protection monitoring system participate in a telemetric monitoring system 19. For example, a base unit of the monitoring system may comprise a communication module that is configured to interface (e.g. wirelessly) with a telemetry network 19. Such an arrangement can enable the fall-protection monitoring system to send signals (e.g. a first positive signal) into the telemetry network 19, which can then forward the signals to the proper aerial lift. (In various embodiments, such signals can go into the telemetry network and from there to the aerial lift, with or without necessarily going through a central monitoring station)

Notifications

In some embodiments, a fall-protection monitoring system as disclosed herein may serve merely to send at least one first positive signal or to not send any such first positive signal (and possibly, in some embodiments, to send a negative signal) to the control circuitry in the manner discussed above. This will enable the control circuitry of the aerial lift to take appropriate action (e.g. to disable the controls so that the aerial lift cannot be elevated upward). In some embodiments, a fall-protection monitoring system may additionally serve to broadcast various notifications. In some embodiments, such a notification will be a "Not Ready" warning in the event that the connector is detected as not appearing to be connected to the user's harness. In some embodiments, the monitoring system may be additionally configured to broadcast a "Ready" confirmation if the connector is detected as appearing to be connected to the user's harness.

By a notification is meant a signal that is broadcast to a user of the aerial lift, to one or more persons in the local surroundings, to one or more designated persons e.g. at a monitoring station, and/or to an automated monitoring or telemetry system, for informational purposes. By definition, any such notification is distinguished from the herein-described first positive signals that are sent to the control circuitry of the aerial lift for purposes of interlocking the aerial lift with the fall-protection system as disclosed herein. Such a notification may be e.g. an audible notification and/or a visual notification and/or a haptic notification. Such notifications may be broadcast locally (e.g. by providing the fall-protection monitoring system with lights or buzzers) and/or may be broadcast e.g. to a smartphone or to a remote monitoring station.

In some embodiments, a fall-protection monitoring system as disclosed herein may be flexibly configured so that even though the monitoring system as manufactured is capable of sending at least one first positive signal in the manner described herein, the monitoring system can be modified so that no such signals are sent. Thus, in some embodiments a fall-protection monitoring system may be configured (e.g., per the desires of a particular end-use facility or fleet) to only send notifications and not to perform any interlocking of the aerial lift. Imparting a monitoring system with flexibility in this regard can provide that the monitoring system may be configured for a customer that wants the system to have interlocking functionality (with or without notifications); or, it may be configured for a different customer that wants only a notification functionality. In some cases, the fall-protection monitoring systems as supplied to different customers may differ e.g. only in particular firmware or software settings such that the interlocking functionality is inactivated (or, in some instances, a notification-only system may omit certain components). In any event, such an arrangement is advantageous over having to manufacture entirely different fall-protection monitoring systems, one for providing interlocking (and optionally, notifications) and one for providing notifications only.

In some embodiments, the aerial lift may be configured to broadcast notifications regarding the readiness (e.g. hook-connection) status of the fall-protection apparatus, based on information transmitted from the fall-protection monitoring system to the order picker control circuitry. (The aerial lift may also be capable of broadcasting notifications regarding the state of the various safety apparatus of the aerial lift itself, e.g. an OPC switch, a safety gate, etc.) Any such notifications may include warning notifications, and may additionally include ready notifications, informational messages and the like. Such notifications as broadcast by the aerial lift as the result of information received from the fall-protection monitoring system may take the form of e.g. audible, visual, and/or haptic/tactile notifications and may be broadcast locally (e.g. by way of lights or buzzers on the aerial lift itself) and/or may be broadcast e.g. to a smartphone or to a monitoring station. Thus by way of a specific example, a console 7 of an order picker may comprise at least one notification unit that displays a notification of the status of the fall-protection apparatus based on signals sent to the control circuitry of the order picker by the fall-protection monitoring system. Such a notification unit may take any suitable form, e.g. green light that illuminates when the monitoring system indicates that the fall-protection apparatus is in a "ready" condition; a red light that illuminates when the monitoring system indicates that the fall-protection apparatus is not in a ready condition; a set of red and green lights; a display screen that indicates a ready or not ready indication, and so on. Any negative notification (whether presented by the fall-protection monitoring system itself or presented by the order picker based on information received from the fall-protection monitoring system) that contains actual verbiage may take any suitable form, e.g. "Not Ready", "Unhooked", "Check Hook-up", and so on. Similarly, any such positive notification may use any suitable verbiage, e.g. "Ready", "Hooked Up", and so on. Fall-protection monitoring systems that are configured to provide notifications are described and discussed in detail in U.S. patent application Ser. No. 17/435,661, entitled "Fall-Protection System with Monitoring System", which is incorporated by reference herein in its entirety. In some embodiments, e.g. if an aerial lift is telemetrically monitored and is equipped with a display screen or mobile data terminal 18 as mentioned earlier herein, any notification may be presented through such a display screen or portable data terminal of a telemetry network.

As discussed in detail later herein, in some embodiments the fall-protection monitoring system may send information to the order picker regarding the status of the fall-protection monitoring system itself. In such cases, the order picker may be configured to present some such information (e.g. "Battery Change Needed") on a notification unit of the order picker. In particular embodiments, the order picker may be configured to receive information from the fall-protection system so that, in the event that the vertical-motion function of the order picker is disabled, the order picker can broadcast a notification of the reason (for example, that the disabling is due to a need to change the sensor module battery, not because a proper connection of the gated hook to the operator's safety harness has not been detected). Any such information may be e.g. presented on a display screen of the order picker and/or may be transmitted to a central monitoring station.

Base Unit and Sensor Module

In some embodiments, a fall-protection monitoring system of a fall-protection safety apparatus (e.g. an SRL) may comprise a base unit 60 and at least one sensor module 34, the sensor module being configured to sense whether the connector appears to be connected to the safety harness and to transmit connector status information to the base unit. Such a sensor module may thus comprise at least one sensor to sense the condition of the connector, and a communication module that transmits this information (whether wirelessly, or by a wire or fiber optic cable) to the base unit. A base unit can comprise a receiving module that can receive connector status information from one or more sensor modules, and a communication module that, based on the information received from the sensor module(s), can send the aforementioned first positive signal to be received by the control circuitry of the aerial lift. In some embodiments, a base unit may also comprise a notification module to emit or otherwise broadcast a notification as mentioned above. A base unit can comprise any processing circuitry needed to operate the above-recited modules, and may comprise any other components as needed for the operation of the base unit and modules thereof.

In some embodiments a base unit may receive raw (or partially processed) data from one or more sensors of the sensor module and may perform any or all actual processing that is needed to ascertain the condition of the connector. In other embodiments, the raw data may be at least partially processed by circuitry that is resident within the sensor module itself. In at least some such cases, the base unit may need only receive yes/no information from the sensor module that indicates whether the connector appears to be connected or not; then, depending on the information, the base unit may or may not send at least one first positive signal to the control circuitry of the aerial lift. It will thus be appreciated that the above-noted arrangement in which a sensor module is configured to sense whether a connector appears to be connected to a safety harness and to transmit connector status information to a base unit, can run the gamut from the sensor module processing all the sensor data and transmitting a final (connected/unconnected) determination of the connector status to the base unit, to a case in which the sensor module merely transmits raw data from the sensor with the base unit processing this data to arrive at the final determination of the connector status. All such arrangements fall within the general premise of a sensor module sensing whether a connector appears to be connected to a safety harness and transmitting connector status information to the base unit. Moreover, in some embodiments the components and functions of a base unit and a sensor module may be thoroughly integrated with each other, as discussed in detail later herein.

In some embodiments, a sensor module 34 of a fall-protection monitoring system may be installed at a connector (e.g. a gated hook) 30 at a distal end of a safety line 52 of a fall-protection safety apparatus. Such terminology encompasses arrangements (illustrated generally in FIGS. 3 and 4) in which the sensor module is located on the connector or is located proximate the connector (e.g. mounted on safety line 52 or on a protective shroud located thereon) as long as the sensor module is close enough to the connector to allow the condition of the connector to be successfully monitored, e.g. to evaluate whether the connector appears to have been attached to a D-ring. In some embodiments, a sensor module 34 may be installed within a housing (e.g. a molded plastic shroud) 36 that is fitted over at least a portion of main body 31 of connector 30, as indicated in FIG. 4. In some embodiments, a sensor module (and also a base unit, if the sensor module and base unit are integrated together as described below) may be at least partially embedded in the material of connector 30 itself, so that connector 30 can serve at least partially as a protective housing for the sensor module and/or the base unit.

In some embodiments, a sensor module may be installed on a harness 40 to which connector 30 is to be attached. For example, a sensor module may be installed at a D-ring (e.g. a dorsal D-ring 41) that is non-removably attached to harness 40. Such terminology encompasses arrangements in which the sensor module is located on the D-ring or is located proximate the D-ring (e.g. on a strap or a dorsal plate of harness 40) as long as the sensor module is close enough to the D-ring to allow the sensor of the sensor module to evaluate whether a connector appears to have been attached to the D-ring. The arrangements disclosed herein thus encompass, for example, configurations in which a connector is monitored for an indication as to whether the connector appears to have been attached to a D-ring, as well as arrangements in which a D-ring is monitored for an indication as to whether a connector appears to have been attached to the D-ring.

Other arrangements are possible. In some embodiments a sensor module may be located at a docking station that is configured to accept connector 30 when connector 30 is not connected to the user's harness (such docking stations are discussed in further detail later herein). In embodiments in which the fall-protection apparatus is a self-retracting lifeline (SRL) 50, the SRL may comprise a sensor module that is configured to monitor the position of connector 30 relative to the housing 51 of the SRL. Such a sensor module might comprise e.g. a sensor that is on the housing and that is configured to ascertain whether connector 30 is in close proximity thereto. Or, such a sensor module might comprise a sensor that is configured to determine the distance to which safety line 52 has been paid out from housing 51 (such a sensor might be, for example, a rotary encoder that tracks the rotation of reel 53 to which the proximal end of safety line 52 is attached). Such a sensor module may thus be configured to provide an indication of, for example, whether connector 30 is snugged up tight against the SRL housing or is proximate (meaning within 0.2 meters of) the housing; or, whether connector 30 has been paid out a considerable distance (e.g. more than 0.2 meter) from the housing. Such information can be used, if desired, as an indication of the condition of the connector. For example, if the connector is reported to be snugged tight against the SRL housing, this may be inferred to be an indication that the connector does not appear to be attached to a harness of an operator.

The discussions above make it clear that a sensor module may be installed e.g. at a connector (e.g. a gated hook), at a harness D-ring to which the connector is to be attached, at a docking station to which the connector can be docked when not in use, or at an SRL housing from which a safety line bearing the connector can be extended. Any such arrangement, and any desired combination of such arrangements, is encompassed within the disclosures herein (noting that e.g. in a configuration in which sensor modules are installed at harness D-rings, a base unit (described below) may be configured so that the base unit is able to receive signals from any of multiple possible sensor modules of multiple harnesses).

A base unit 60 of a fall-protection monitoring system, that receives information from a sensor module(s) indicative of the condition of the connector, can be positioned in any suitable location. In some embodiments, a base unit 60 may be installed on the aerial lift. For example, a base unit 60 may be installed on or within a console 7 of the aerial lift, as indicated in FIG. 2. In other embodiments, a base unit may be installed e.g. on an overhead guard 9 of the aerial lift, as indicated in FIG. 1. In some embodiments a base unit of a fall-protection monitoring system may be at least partially integrated into the circuitry of the aerial lift itself and thus may not necessarily reside in a housing that is physically separated from other items of the circuitry of the aerial lift. A base unit located on an aerial lift, e.g. that is not co-located with a sensor module, can communicate with the sensor module in any suitable manner, e.g. via short-range wireless methods such as Bluetooth. Bluetooth LE, LoRa, Zigbee, or Wi-Fi; and/or, by a wired connection, and/or, over a long-range wireless network such as a cellular network.

A base unit and sensor module are not necessarily limited to any of the above arrangements; in particular, a base unit is not limited to being installed on an aerial lift itself. For example, in some embodiments, a base unit may be installed at or on a connector of a safety line. In some such embodiments, a base unit may be co-located with a sensor module that is at or on a connector (e.g. a gated hook) of a safety line of a fall-protection apparatus. In some such co-located embodiments, a base unit and a sensor module may be integrated with each other e.g. so as to reside at least partially within a single physical housing or unit. For example, electronic components that make up a base unit, and those that make up a sensor module, may all be disposed on a single printed circuit board or flex circuit. (In such cases, it may be convenient to operate the base unit and the sensor module from the same power source.) In such a co-located, e.g. integrated, design, it is not necessary for the components that make up a base unit, and those that make up a sensor module, to be grouped separately. Rather, any such components may be intermingled.

Based on the above discussions, it is clear that there is no need for a base unit to have all of its components in a single location. Rather, a base unit may be configured for example with one or more components co-located with a sensor module e.g. on a connector (and e.g. powered by a battery located on the connector), and one or more other components that are in a separate location, e.g. in a separate housing mounted somewhere on the aerial lift. It is thus emphasized that there are no particular restrictions on base units and sensor modules. For example, some embodiments in which a base unit and sensor module are integrated with each other, a base unit may be reduced essentially to a communication module in the form of e.g. a short-range wireless radio and circuitry to operate the radio. Similarly, a sensor module may be reduced essentially to one (or more) sensors and circuitry to operate the sensor(s). A common power source (e.g. a battery) may be used to power an integrated base unit/sensor module. Since, in such a scenario, the "base unit" and "sensor module" are likely to be very close to one another, a hardwired connection may be convenient for enabling the sensor module to communicate connector status information to the communication module of the base unit (with the hardwired connection thus serving as a communication module of the sensor module and as a receiving module of the base unit). Any processing circuitry that analyzes the information from the sensor may be considered to be part of the base unit and/or a part of the sensor module, since in such an embodiment the base unit and sensor module may be thoroughly integrated with each other.

The term "base unit" is used herein for convenience in describing an entity or a collections of entities that perform, alone or in combination, certain functions involved in the herein-disclosed interlocking arrangement. As a reminder, such functions will comprise, at minimum, receiving connector status information from a sensor module and sending a first positive signal directly or indirectly to an aerial lift. The term base unit thus does not imply any specific physical construction or location. In particular, a base unit does not necessarily need to be a relatively bulky item that is mounted on an aerial lift and is spaced at some distance from a sensor module with which it cooperates. Rather, in some instances a base unit may be quite small, and may be integrated together with a sensor module e.g. on a connector.

Thus for example, a hook-mounted collection of items that includes at least one sensor that detects a connector status, a wireless transmitter/receiver (e.g. a Bluetooth LE radio) that receives connector-status information from the sensor and (based on the connector status information) wirelessly sends a first positive signal to operating circuitry of an aerial lift, along with whatever items are needed to power and operate the sensor and the transmitter/receiver, will be considered to comprise a sensor module and a base unit that are encompassed within the disclosures herein.

In various other embodiments, a base unit may be installed on the harness, e.g. at a harness D-ring. In such embodiments, the base unit may be co-located with a sensor module that is installed at the D-ring and may receive signals therefrom; or, the base unit may be installed on the harness but may receive signals from a sensor module that is installed at the connector rather than at the D-ring. In some embodiments, a base unit may be installed at (e.g. on or within) a housing of a self-retracting lifeline.

Any of these are possible. In some convenient embodiments, a base unit 60 may be installed near, on, or within a console 7 of the arial lift as noted above. This may advantageously position the base unit close to the control circuitry 17 of the aerial lift, and/or may make it convenient for the base unit to draw power from the aerial lift rather than having to have its own power supply. This may also make it easier for the base unit to transmit any first positive signals to the control circuitry of the aerial lift via a wired connection rather than wirelessly, although either of these may be acceptable. (In this context a "wired" connection broadly encompasses any physical connection using electrically-conductive wire, optical fiber, and so on.) In some embodiments, a base unit may be mounted generally above the operator of an aerial lift, e.g. on an overhead guard 9 of an aerial lift. Such a location may be advantageous e.g. if it is desired to provide a mechanism for detecting the presence of an operator e.g. via using one or more proximity sensors as discussed elsewhere herein.

The term sensor module is used in general to describe an item, or collection of items, that includes at least one sensor that performs sensing so as to acquire connector status information, a communication module (which may take the form of e.g. a wireless transmitter, or a simple wired connection) to send the connector status information gathered by the sensor to a base unit, and any necessary hardware, software and so on (including, in some cases, a power source), to operate the sensor(s), to process the information as needed, to operate the communication module, and so on. The sensor module may e.g. be partially or wholly encompassed within a housing, e.g. a molded plastic housing, which housing may be e.g. attached to or otherwise disposed on a connector or a D-ring. In some embodiments the sensor module may be attached e.g. to a safety line or a shroud thereon, or to a component (e.g. a strap or a dorsal plate) of a harness, as long as the sensor of the sensor module is positioned in a location that allows it to perform its desired function.

The term sensor module is used for convenience in describing certain functions involved in the herein-disclosed interlocking arrangement and does not imply any particular physical construction. For example, embodiments were discussed above in which a sensor module and a base unit are highly integrated; in particular, an arrangement was described comprising a one or more sensors, a wireless transmitter/receiver (e.g. a Bluetooth LE radio) that communicates a first positive signal to operating circuitry of an aerial lift, and various items as needed to operate the sensor(s) and the transmitter/receiver. In such an instance, a sensor module of such an integrated base unit/sensor module might comprise as little as the sensor(s) and a communication module that sends information gathered by the sensor(s) to the wireless transmitter/receiver (in other words, to a "base unit" of the integrated base unit/sensor module). The "communication module" of the sensor module might be as little as one or more wires, optical fibers, or even conductive traces on a circuit board or flex circuit, that connect the sensor(s) to the wireless transmitter/receiver.

Based on the above discussions it will be appreciated that in some embodiments, a short-range wireless radio that is present on a connector of a safety line of a fall-protection monitoring system may serve as a communication module of a sensor module, e.g. in an arrangement in which the wireless radio sends connector status information to a separately-located base unit that then sends a first positive signal to control circuitry of an aerial lift. In other embodiments, a wireless radio that is present on a connector of a safety line of a fall-protection monitoring system may serve as a communication module of a base unit, e.g. in the case of an integrated base unit/sensor module in which the wireless radio receives connector status information from a sensor module (e.g. by a wired connection) and in which the hook-mounted wireless radio itself sends a first positive signal to control circuitry of an aerial lift. Either scenario, and various modifications thereof, are encompassed within the disclosures herein.

In some embodiments, a first sensor of a sensor module may be configured to detect one or more metals. This may be useful since connectors (hooks/carabiners) of fall-protection apparatus and items (such as D-rings) to which such connectors are connected are typically made of metals such as steel and the like. Thus, a sensor located at a D-ring or docking station may be able to detect the presence of a metal connector; conversely, a sensor located at a connector may be able to detect the presence of a metal D-ring. In particular embodiments, any such sensor may be configured to particularly detect a metal item or a portion thereof that is positioned within, or close to, an opening defined by the entity at which the sensor is installed. For example, a connector (e.g. a gated hook) may be equipped with a sensor module whose sensor or sensors are configured to detect a portion of a metal item (e.g. a D-ring) that is within, or close to, the opening defined by the hook. Any such sensor, if installed on or near an entity that is itself made of metal, may be configured to compensate for such metal (i.e., the sensor may be configured to detect the presence of an additional metal item, above and beyond the metal that is already there).

In some embodiments such a sensor may rely on electromagnetic sensing. In some embodiments such a sensor may rely on inductive sensing. In some embodiments of this type, such a sensor may interrogate and monitor changes in a resonant frequency of an electronic circuit of an inductive sensor (which changes may result e.g. from eddy current phenomena that is generated when a metal item is brought into an inductive field). Inductive sensing in general, and leveraging of eddy current phenomena in particular, are discussed in detail in U.S. Provisional Patent Application No. 62/628,720, and the resulting PCT application published as WO2019/157007, both of which are incorporated by reference in their entirety herein. It will be appreciated that many of the principles, arrangements and methods disclosed in these documents may be useful for purposes of the present application.

Although discussions above have primarily concerned sensing of metal items, e.g. by inductive sensing, it will be appreciated that any sensor, relying on any sensing mechanism, may be used to sense whether an item is present in an opening of a connector such as a gated hook (in more general terms, such a sensor or sensors can detect, in any suitable manner, whether the connector is connected to an item, e.g. to a D-ring of a safety harness). In various embodiments, such a sensor may be any kind of electromechanical sensor, e.g. a load cell that can detect whether the hook has been placed under load.

In some embodiments, such a sensor may be an RFID or NFC reader that is configured to detect an RFID or NFC tag or beacon that is present on or in the item (e.g. a D-ring, a docking station, etc.) that the hook is to be connected to. For example, a sensor of a sensor module may comprise an RFID reader that is mounted on a connector (e.g. a gated hook) at the end of a safety line of an SRL, the RFID reader being configured to read an RFID tag that is located at or on a D-ring of a user's fall-protection safety harness. The effective range at which the RFID reader can read the RFID tag can be set so that a positive recognition by the RFID reader of the RFID tag can be considered to be an indication that the connector is connected to the D-ring. Any suitable variation of these arrangements may be used; for example, in the case of a personal SRL as discussed later herein, an RFID tag may be located on an anchorage rather than on a D-ring of a safety harness. Or, in some instances an RFID reader may be located on a harness D-ring or on an anchorage and may be configured to read an RFID tag that is located on a connector (e.g. a gated hook) of an SRL. In embodiments in which an aerial lift is a multi-occupant lift as discussed elsewhere herein, multiple anchorage points may be present, each with an RFID tag (or an RFID reader). In various embodiments, all such RFID tags may be generic; or, they may be uniquely identifiable when read by an RFID reader. In some embodiments a detection scheme based on RFID readers and tags may be used in combination with a gate sensor of the general type discussed below.

In other embodiments, other sensing mechanisms, e.g. relying on one or more optical sensors, one or more mechanical switches, one or more ultrasonic sensors (or proximity sensors of any suitable type and operating mechanism), and so on, may be used.

In some embodiments, at least one other sensor, operating by any sensing mechanism and provided in any particular location and/or applied to any particular step or operation in the use of connector 30 or of the fall-protection apparatus in general, may be used. Such a second sensor may operate by some other mechanism than detecting whether an item is present in the opening defined by the hook. While in some embodiments such a sensor may be used in place of the above arrangements, in many advantageous embodiments such a sensor may be used in combination with the above-described arrangements. For example, in some embodiments a hook may be provided with a gate sensor that can monitor the status of a gate of the connector. Such a sensor may be used e.g. in combination with any of the other sensors described herein. For example, in some embodiments one or more first sensors may be used that are inductive sensors configured to determine whether a metal item (e.g. a metal D-ring) is present in the opening of the connector; and one or more second, gate sensors may be used to monitor the status of a gate of the connector.

Any such data or indication provided by a gate sensor will fall under the general category of reporting whether the gate is "secured" or "unsecured". In some embodiments it may not be that, for example, a gate of a hook must actually be in an open position to be reported as "unsecured". Rather, the gate may merely be e.g. unlocked or not completely secured. For example, a connector may be a double-action connector of the general type noted earlier, for example a "twist-lock" hook in which a locking mechanism (e.g. collar) of the gate of the hook must be rotated slightly in order to unlock the gate so that it can then be opened. A gate sensor may be configured to report that the gate is unsecured e.g. if it is detected that the locking collar does not appear to have been rotated to its fully locked position, even if the gate itself has not actually been opened.

In some embodiments a second sensor such as e.g. a gate sensor, may operate by a different mechanism than the first sensor or sensors. For example, in some embodiments, a gate sensor may be a so-called Hall-effect sensor. In some embodiments such a sensor may be configured to detect the presence or absence (within a predetermined distance) of a magnetic beacon that is purposefully installed in the gate. For example, such a magnetic beacon (e.g. a piece of any suitably magnetic material) may be installed into a cavity provided in a twistable portion (e.g. a locking collar) of the gate. The gate sensor may detect the magnetic beacon, and report its presence, when the beacon is in close proximity to the sensor (e.g. when the gate is closed and the locking collar is in its locked position). The sensor may report the absence of the magnetic beacon upon the locking collar being rotated away from its locked position (thus moving the beacon away from the sensor) to allow the gate to be opened. In some embodiments any such gate sensor may alternatively be configured (e.g. the sensor and magnetic beacon may be positioned) to detect the beacon when the gate is not secured, and to detect the absence of the beacon when the gate is secured.

As noted earlier, in many embodiments the output of a fall-protection monitoring system as disclosed herein will include at least one first positive signal, based on indications received from at least one sensor or sensors. In some embodiments in which first and second sensors are used, an indication from the first sensor alone, or an indication from the second sensor alone, may not be sufficient to allow a first positive signal to be generated. That is, in some embodiments appropriate indications must be received from both a first sensor and from a second sensor. Thus, for example, a monitoring system for a gated hook may be configured so that data must be received from a first sensor indicating that a metal item (e.g. a metal D-ring) is or has been detected in the opening of the hook; and, data must be received from a second sensor indicating that the gate of the hook is secure, in order for a first positive signal, indicating that the connector of the fall-protection apparatus appears to be connected to a harness of a user of the aerial lift, to be issued. The use of information from first and second sensors in combination in this general manner is described in further detail e.g. in U.S. Provisional Patent Application No. 62/978,024 and in the resulting PCT application published as WO 2020/194121, both of which are incorporated by reference in their entirety herein.

Power Management

In some embodiments a sensor module 34 may be powered by an internal power source, e.g. a battery 37. By internal is meant that the power source/battery is located within the same overall housing (e.g. housing 36 as shown in FIG. 4) within which the sensor module is located; the battery does not have to be within the sensor module itself although in some instances it may be. If the sensor module is located e.g. within a housing 36 provided on a connector 30, then (depending on the size of the housing and the connector) the space available for a battery may be limited. In some such cases, the battery may need to take the form of one or more small, low-capacity batteries (e.g. AAA, "coin" or "button" batteries) to fit within the available space. (Other power sources, e.g. one or more rechargeable batteries or rechargeable supercapacitors, and so on, may be envisioned, but will still need to fit within the available space.) Thus in some embodiments, it can be advantageous to configure, and operate, first and second sensors of the sensor module in a way that will maximize battery life without compromising the performance of the sensor module.

For example, in embodiments in which a first sensor is an inductive sensor that detects whether a metal item such as a D-ring is present within an opening of a gated hook, and in which a second sensor is a gate sensor that is Hall-effect sensor that detects whether the gate of the connector is closed and secured, the first, inductive sensor, when it is active, may exhibit a power consumption that is greater than the power consumption of the second. Hall-effect sensor, by a factor of ten, one hundred, or even one thousand or more. Accordingly, in some embodiments the circuitry that operates the first and second sensors may be configured so that the first, inductive sensor is not activated until the second. Hall-effect gate sensor has detected a change in status of the gate, e.g. has detected that the gate has become unsecured. The first sensor may then remain in active operation for a selected period of time as long as the gate remains in a particular condition (e.g. unsecured), and possibly for an additional selected period of time after the gate has returned to another condition (e.g. has become secured). After this, the first sensor can be returned to an inactive state in which it consumes little or no power. When a change in status of the gate is again detected, the first sensor may again be activated. Otherwise, the first (inductive) sensor may remain shut down and thus the sensor module as a whole may remain in a low-power-consumption state, indefinitely.

First and second sensors can thus be configured for efficient power management, under the general principle that a more energy-consuming sensor need only be triggered to become active upon a suitable signal being received from a more energy-efficient sensor. In the specific example provided above, a second, low-energy-consuming Hall-effect sensor may be at least quasi-continuously operated (e.g. to interrogate a gate status up to several times a second or even continuously), while a first, highly energy-consuming inductive sensor may remain inactive until triggered to become active in response to a change in gate status indicated by the second, gate sensor. Such arrangements allow a base unit of a fall-protection monitoring system to continue to send at least one first positive signal to the control circuitry of an aerial lift (thus allowing the vertical-motion function of the aerial lift to remain enabled), as long as the base unit continues to receive information from the sensor module indicating that, according to the second, gate sensor, the gate of the gated hook continues to remain closed and locked. The first, inductive sensor may remain inactive during this time, so that the sensor module as a whole remains in a low-power-usage state.

The above arrangements are merely one example of how a sensor module comprising at least one first, highly-energy-consuming sensor, and at least one second, low-energy-consuming sensor, can be configured for efficient use of battery power. Other scenarios are possible. For example, in the above scenario, the sensor module continues to send information to the base unit that the hook gate remains closed and secure. This information may be sent by a short-range wireless radio (e.g. by a Bluetooth or Bluetooth Low-Energy radio that the sensor module is equipped with). Under some conditions, the short-range wireless radio itself may be shut down thus providing additional energy savings. Thus in a particular example, if an order picker is shut down (e.g. for an operator lunch break) so that power to the base unit of the fall-protection monitoring system is shut off, the short-range wireless radio of the sensor module will receive no reply to its continued signals to the base unit. The sensor module may be configured so that if the sensor module receives no reply from the base unit for a predetermined amount of time (e.g. 1, 2, 5, 10, 30, or 60 minutes) the short-range wireless radio of the sensor module (and/or any other component that is not needed) will be shut down. At this point, the sensor module will be in a very-low-power-usage state.

In such a very-low-power-usage state, the sensor module may, for example, be using power only to run a very-low-power-consumption sensor such as an above-mentioned Hall-effect sensor, to continue whatever processor functions are necessary to run the sensor, to continue whatever processor functions are necessary to enable to the sensor module to return to a fully active operating condition upon detecting an appropriate signal from the sensor, and so on. Such a state may minimize the battery drain to a very low value, e.g. during a time that the order picker is not operating. In some embodiments, other low-power-usage functions or states of the operating circuitry of the sensor module may be maintained. For example, an internal clock may continue operating and may periodically awake a short-range wireless radio to listen for any signal from the base unit.

In a variation of this that may be particularly useful e.g. in the case of a base unit and sensing module that are integrated with each other on a connector, the integrated base unit/sensing module may be configured to enter a very-low-power-usage state if no signal is received from the aerial lift (e.g. by a short-range wireless radio of the integrated base unit/sensing module) for a predetermined period of time. When in this very-low-power-usage state, the integrated unit/module may use only an amount of power needed to keep the short-range wireless radio awake in order to be able to receive a signal from the aerial lift. Once such a signal is received, the integrated unit/module may be restored to full operation.

The above-described scenario, in which a very low-energy-consuming sensor such as a Hall-effect sensor is monitored so that the sensor module can be returned to a normal operating condition when triggered to do so by the low-energy-consuming sensor, can have an additional advantageous effect. Specifically, this can provide that the sensor module need not have a physical on/off switch. Rather, to return to the example provided above, when an operator returns from a lunch break the operator can simply manipulate the hook gate 32 (e.g. can twist a collar 33 of the gate, in which collar a magnetic beacon is embedded) to reactivate the sensor module 34 from a very-low-power-usage state. Thus in this case a hook gate can serve as a de facto "on-off" switch, with a separately-provided on-off switch not being needed. It is highly advantageous to have the hook gate serve in this manner, since the manipulation of the hook gate that will be required in order to re-attach the hook to the D-ring of the operator's harness will serve to reactivate the sensor module (and thus to turn the monitoring system back "on") without any other action being required in order to reactivate the sensor module.

Strictly speaking, manipulation of the gate in this manner will not be turning the sensor module on from a completely unpowered state, but rather will be activating it from a very-low-power-usage state as described above (in which state the gate sensor, and selected functions of the operating circuitry of the sensor module, are still active). However, the energy drain in this state has been found to be so small (e.g., in the range of a few microwatts) that in most instances there is no need to provide a means to turn the sensor module completely "off". Such arrangements can advantageously allow the sensor module to return to a fully active state extremely quickly and can minimize the chances of inadvertently turning off the sensor module due to incidental contact with an on-off switch during work activities.

It will be appreciated that in embodiments in which a base unit and a sensor module are co-located e.g. on a connector, and in particular in arrangements in which these entities are integrated with each other in the general manner described earlier herein, the above discussions regarding the need to conserve power, and to minimize (or cut completely) the power to various components and functions, will apply in like manner to components of a base unit that is integrated with a sensor module. On the other hand, a base unit that is e.g. tied into the circuitry of an aerial lift may be powered by the power source of the aerial lift itself, and may have no need for such reduced-power-consumption arrangements.

Other arrangements of this general type may be envisioned in which a low-power-consumption sensing method can be used to reactivate a sensor module (and/or a base unit, e.g. if the base unit is integrated with the sensor module) from a low-energy-consumption state; e.g., from a deep sleep. For example, a sensor module that is installed e.g. on a connector of a monitored fall-protection apparatus may comprise one or more accelerometers. Such an accelerometer may be configured to detect e.g. motion indicative of the connector being manipulated by a person, motion indicative of operation of an aerial lift on which the connector is mounted, and so on. Thus in some embodiments, a sensor module may comprise an accelerometer for purposes of determining that operation of an aerial lift is commencing, and to appropriately bring one or more components (e.g., a sensor module) of the fall-protection monitoring system to full operational readiness. When in a low-power-consumption state, the system may draw power only to an extent needed to operate the accelerometer; detection of motion by the accelerometer can then trigger a component (e.g. a sensor module) to become fully operational or to become operational to any designated extent. The same can apply to a base unit if the base unit is co-located, e.g. integrated, with the sensor module.

In some embodiments, a fall-protection monitoring system may be equipped with the capability to detect the presence of an operator, e.g. a person standing on an operator-support platform of an order picker type of aerial lift. (In a slight modification, an aerial lift itself, as manufactured, could be equipped with such functionality, e.g. with the aerial lift being configured to provide this information to the fall-protection monitoring system.) Such arrangements may make use of an operator-detection module, e.g. a proximity-sensing module comprising one or more proximity sensors, operating by any suitable mechanism. In some particular embodiments, this may rely on one or more ranging proximity sensors, e.g. time-of-flight laser proximity sensors.

In some embodiments, a fall-protection monitoring system may rely on information from an operator-detection module in order to appropriately bring one or more components (e.g., a sensor module) of the fall-protection monitoring system to full operational readiness. When in a low-power-consumption state, the system may, for example, draw power only to an extent needed to operate the operator-detection module; detection of the presence of an operator can then trigger one or more other components of the monitoring system (e.g. a sensor module) to become fully operational or to become operational to any designated extent.

Any such operator-detection module may be configured to provide its obtained information to the fall-protection monitoring system in any suitable way. For example, in some embodiments one or more proximity sensors may be hard-wired to a base unit (e.g., with the base unit, and the one or more proximity sensors, being mounted on an overhead guard of an aerial lift). In such an arrangement, the base unit may provide power to the proximity sensors; and, the proximity sensors may send their information to the base unit by way of a wired connection thereto. If operator-detection is used as a basis for activating a sensor module from a low-power-consumption state, the operator-detection module may communicate the information to the sensor module in any suitable way, e.g. by short-range wireless. For example, an integrated base unit and sensor module (e.g., on a gated hook) may include a short-range wireless radio that is kept in operation when in the low-power-consumption state so that information can be received from the operator-detection module. Thus in various embodiments, an operator-detection module may be used to activate a sensor module and/or base unit from a lower-power-consumption state; or, in general, to bring any chosen functionality or functionalities of a base unit and/or sensor module to a more active state. Further details of operator-detection are described and discussed in U.S. patent application Ser. No. 17/435,661, entitled "Fall-Protection System with Monitoring System", which is incorporated by reference herein in its entirety.

In some embodiments, start-up and/or operation of at least some components of a fall-protection monitoring system may be configured to act in cooperation with an operator authentication device of the aerial lift. For example, a base unit may be powered by an auxiliary power circuit of an aerial lift, with the aerial lift being configured so that the auxiliary power circuit is not activated until an operator has been authenticated e.g. by way of an operator authentication device of the general type described earlier. In such a case, the base unit may not begin operation until after the operator has e.g. badged in (in other words, the fall-protection monitoring system may itself be interlocked with an operator authentication device).

In various embodiments, any combination of any of the above-discussed arrangements may be used, e.g. so that a base unit, a sensor module, and/or an integrated base unit/sensor module, may be restored to full operation (and power consumption) in more than one possible way, as triggered by any of two or more of the disclosed arrangements. Thus for example, an integrated base unit/sensor module may be configured so that when in a very-low-power-usage state, a short-range wireless radio is kept in operation, and a low-energy-consuming sensor (e.g. a Hall-effect gate sensor) is kept in operation, so that a wake-up may be triggered either by the wireless radio receiving a signal from the aerial lift, or by the low-energy-consuming sensor detecting e.g. a change in gate status. Similar arrangements could be used with the combination of a short-range wireless radio and an accelerometer.

The above-discussed arrangements may be most advantageously used in the case of items that rely on their own power source; in particular, items (such as e.g. a hook-mounted sensor module or hook-mounted integrated base unit/sensor module) that are in a location where there is limited space for a battery. On the other hand, an item such as a base unit that is hardwired to the circuitry of an aerial lift may be able to draw power directly from the aerial lift, so that there may be little or no need to set up an arrangement to reduce the power consumption of such an item during periods in which the aerial lift and fall-protection monitoring system are not in actual use. Of course, any item that receives its power from an aerial lift may be powered down when the aerial lift itself is powered down. In fact, an item that does not receive power from an aerial lift may nevertheless shut itself down (or at least cut back into a low-power-consumption mode or deep sleep) if it receives a signal indicating that the aerial lift with which it is being used, is being shut down.

Supplemental First Positive Signals and Self-Checking

With fall-protection monitoring systems and exemplary components and features thereof having been described, the subject of the first positive signal(s) transmitted from the fall-protection monitoring system to the control circuitry of the order picker to enable at least the vertical-motion function of the order picker can be discussed in more detail. Discussions so far have focused on the fall-protection monitoring system sending a single first positive signal that is indicative of whether the connector of the safety line appears to be connected to the safety harness of the user. In some embodiments, this may be sufficient for the control circuitry of the order picker to enable at least the vertical-motion function of the order picker. However, in various embodiments, any number of first positive signals can be sent by the fall-protection monitoring system. Any such first positive signals greater than one will be termed "supplemental" first positive signals, to distinguish them from the previously-described "additional" positive signals. Thus as a reminder, any positive signal that is sent to the order picker by the fall-protection monitoring system is a "first" positive signal, which designation includes any "supplemental" first positive signals. Any positive signal that is sent to the order picker by a safety apparatus of the order picker itself (e.g. an OPC switch, a safety gate, etc.) rather than by the fall-protection monitoring system, is termed an "additional" positive signal.

In an arrangement involving multiple first positive signals, the control circuitry of the order picker may be configured so that it must successfully receive all required first positive signals to enable at least the vertical-motion function of the order picker. In some such embodiments, one or more supplemental first positive signals may be present to add redundancy. Thus for example, a first positive signal may be indicative of whether the connector of the safety line appears to be connected to the safety harness of the user, and a supplemental first positive signal may likewise be indicative of whether the connector of the safety line appears to be connected to the safety harness of the user. In such arrangements, the order picker may need to receive both of the signals to enable the desired function(s) of the order picker.

In some embodiments, one or more supplemental first positive signals may be used so that the condition of the fall-protection monitoring system itself can be taken into account when determining whether to enable the desired function(s) of the order picker. For example, the fall-protection monitoring system may be configured to perform a self-check e.g. of the functioning and readiness of any or all of the electronic components, firmware, communication systems, and so on, of the sensor module and/or the base unit of the fall-protection monitoring system. In such embodiments, various supplemental first positive signals may or may not be issued depending on the readiness of the base unit and the sensor module as evaluated in the self-check.

Such arrangements can provide that at least the vertical-motion function of the order picker may not be enabled if a readiness self-check reveals that, for example, the fall-protection monitoring system is in the midst of a firmware update, a Bluetooth radio of the sensor module and a Bluetooth radio of the base unit are in the midst of wirelessly pairing with each other, or if a momentary communications dropout exists between the base unit and the sensor module. (It will be understood that these are exemplary conditions and various other conditions may have similar effect.) That is, if any of these (or any other potentially problematic condition) are discovered in the self-check of the readiness of the fall-protection monitoring system, the corresponding supplemental first positive signal or signals will not be transmitted to the control circuitry of the order picker.

In another example, one or more supplemental first positive signals may be used in order that the condition of a battery of the sensor module can be taken into account when determining whether to enable the desired function(s) of the order picker. Thus for example, the fall-protection monitoring system may be configured to assess the remaining life of the sensor module battery. If this remaining battery life is above a prechosen threshold, a supplemental first positive signal will be sent to the order picker. If the remaining battery life is at or below this threshold, the supplemental first positive signal will not be sent. In some embodiments, the assessment of battery life, and action taken based thereon, may be multi-stage. Thus for example, if the assessed battery life is somewhat low but is not below the above-described threshold, the fall-protection monitoring system may merely issue a notification that the battery should be changed in the near future. If the assessed battery life is at or below the threshold, the supplemental first positive signal will not be issued. Also, a notification may be issued that the battery must be changed before use of the order picker can resume.

In some embodiments, a self-check of the readiness of the fall-protection monitoring system can extend to a check of at least some components, or aspects, of the fall-protection apparatus itself. Thus for example, one or more supplemental first positive signals may be devoted to reporting the readiness of an energy absorber (if one is present in this particular fall-protection apparatus) and can be taken into account when determining whether to enable the desired function(s) of the order picker. As noted earlier herein, many energy absorbers comprise segments of webbing that are e.g. accordion-folded together and attached to each other e.g. by stitching, so that they can be separated from each other to absorb energy in the event of a fall. In some embodiments, one or more sensors may be installed on such an energy absorber and can report whether the energy absorber appears to be in a ready condition or if, for example, some segments appear to have become somewhat separated from each other or otherwise comprised. If this latter condition (or any condition that calls into question the readiness of the energy absorber) is detected as possibly being present, the fall-protection system can refrain from issuing a corresponding supplemental first positive signal. (In some embodiments, the system may also issue a notification that the fall-protection apparatus, in particular the energy absorber, may need to be serviced.) It is stipulated however that any such interlocking and/or notification arrangement based on monitoring of the energy absorber will not negate the need for inspection of the energy absorber, e.g. in accordance with all applicable laws, rules, codes, standards, and so on. Energy absorbers of other designs (e.g. not based on accordion-folded/stitched segments of webbing) may similarly be monitored by means of one or more sensors that are appropriate for that type of energy absorber.

In various embodiments, any of the supplemental first positive signals disclosed above, alone or in combination with any other first positive signal(s), may be used. Thus, in various embodiments, an interlocking approach as described herein may rely on multiple first positive signals (e.g. from two to five, ten, or more) that must be sent by the fall-protection monitoring system, and received by the control circuitry of the order picker, to enable at least the vertical-motion function of the order picker. Exemplary arrangements by which such multiple first positive signals may be transmitted from a fall-protection monitoring system to an order picker, will be presented later herein.

The discussions above thus reveal that in embodiments in which a fall-protection monitoring system is configured to perform self-checks of multiple (e.g. first, second and third) components of the fall-protection monitoring system, a base unit may be configured to send multiple (e.g., up to three) supplemental first positive signals, all of which will need to be received by the operating circuitry of the aerial lift in order to enable at least a vertical-motion function. Thus for example, a first self-checked component of the fall-protection monitoring system may be a sensor module, a second self-checked component of the fall-protection monitoring system may be a base unit, and a third self-checked component of the fall-protection monitoring system may be an internal battery that powers at least the sensor module. However, in some embodiments, the results of any such self-checks may be combined into a lesser number of signals. For example, a single supplemental first positive signal may be sent if all components (e.g., all three components, in the above example) of the monitoring system each pass a self-check, with the single supplemental first positive signal not being sent if any of the components does not pass the self-check. Indeed, in some embodiments the findings of one or more self-checks may be combined into the previously-discussed first positive signal, so that the presence or absence of a first positive signal will be based not just on whether the connector is connected or not, but will also be based on the operating readiness of one or more components or aspects of the monitoring system itself, as evaluated by one or more self-checks of the monitoring system. However, in some embodiments it may be preferable that the connection status information, and various self-check information, be the subject of different first positive signals, for example so that if an aerial lift is prevented from elevating, it can be more quickly determined whether this is the result of an apparent failure to connect properly or is the result of a problem with some particular component of the fall-protection monitoring system itself. It will be appreciated that many variations on such arrangements are possible. For example, in the case of a sensor module and base unit that are integrated with each other, a single self-check may evaluate both of these in a single operation.

Communication

A base unit or units, a sensor module or modules, the control circuitry of the aerial lift, and so on, can communicate in any desired manner. In some embodiments (e.g. in which a base unit is mounted on the aerial lift and a sensor module is on a connector of a fall-protection apparatus), communication between a base unit and a sensor module may be wireless. This may be done for example by a short-range wireless method such as Bluetooth, Bluetooth Low Energy. LoRa, wi-fi, or any other suitable method or protocol. Or, it may be done over a cellular network.

In other embodiments (e.g. in which a base unit is co-located, e.g. integrated, with a sensor module) a wired connection may be used. In some embodiments such a wired connection may be a physical wire or optical fiber. In some embodiments, e.g. in which a base unit and sensor module are integrated with each other so as to e.g. reside on a common printed circuit board or flex circuit located e.g. within a plastic shroud or housing mounted on a connector of a fall-protection safety apparatus, the wired connection may take the form of one or more conductive traces e.g. on such a circuit board or flex circuit.

In various embodiments, the communication between a base unit and a sensor module may be two-way or one-way, as desired. For example in some embodiments a sensor module may wirelessly transmit to a base unit, but not vice versa. In such embodiments the sensor module may, for example, take sensor readings e.g. at a predetermined schedule and transmit the results to the base unit. However, in many embodiments it may be preferred to have two-way communication, e.g. so that the base unit can transmit software or firmware updates to the sensor module, can respond to the sensor module to confirm that the base unit is active and functioning, and so on.

In some embodiments, a base unit may, whether on a predetermined schedule or in response to an event, send an instruction to the sensor module to take a sensor reading and return the result to the base unit. The sensor module(s) and base unit(s) may be configured in the usual manner to perform an electronic handshake or the like, e.g. to ensure that (particularly in instances in which multiple aerial lifts operate in fairly close proximity) the base unit is communicating with the proper sensor module and vice versa. As discussed earlier herein, in some embodiments a sensor module may be configured to send an intermittent, quasi-continuous, or continuous signal (e.g. by way of Bluetooth Low Energy) to a base unit until such time as the sensor module does not receive a reply/confirmation from the base unit for a predetermined time interval, at which point the sensor module may cease to send the signal until reactivated in the general manner described earlier herein.

Communications between a base unit and the control circuitry of an aerial lift may take any suitable form, e.g. wired or wireless (e.g. using any of the above-listed methods); and, any such communication may be one-way (base unit to control circuitry) or may be two-way. Furthermore, any such communication may be direct (e.g. a base unit may communicate with an aerial lift via a wired connection or via a short-range wireless method such as e.g. Bluetooth LE); or it may be indirect (e.g. a base unit may communicate with an aerial lift via a telemetry network that the fall-protection monitoring system, and the aerial lift, are members of). In some embodiments, wireless communication may be performed over a cellular network.

In various embodiments, any such communication (whether e.g. between a base unit and a sensor module, between a base unit and an aerial lift, or between an integrated base unit/sensor module and an aerial lift) may be analog, or may be digital. For example, an at least one first positive signal may be converted to digital form and then transmitted (whether wirelessly e.g. via Bluetooth Low Energy or whether by a wired connection such as provided by an electrically conductive wire or a fiber optic cable) to the control circuitry of the order picker. Any necessary analog-to-digital conversion may be performed at any suitable point along the path of data flow, by any suitable converter (regardless of whether such a converter is considered to be part of a sensor module, or part of a base unit, noting yet again that in some embodiments such entities may be integrated together).

As noted above, in some embodiments a base unit and operating circuitry of an aerial lift, and/or a base unit of an integrated base unit/sensor module and operating circuitry of an aerial lift, and/or a base unit and a sensor module, may communicate by way of a short-term wireless method such as Bluetooth Low Energy. In some instances it may be necessary for the items to reestablish contact with each other. This may happen e.g. after a battery replacement of a sensor module and/or of an integrated base unit/sensor module, after a shutdown of the aerial lift operating circuitry that is responsible for maintaining communication with the base unit (e.g. if the aerial lift as a whole is powered down), or after an SRL that a base unit and/or sensor module are installed on is temporarily taken out of range of the short-range wireless radio of the aerial lift, among other possibilities.

To allow for such interruptions or eventualities, the items (e.g., respective Bluetooth LE radios) may be configured to re-establish contact with each other. In some instances (e.g. after a short communication interruption that does not involve a power loss), this may be performed automatically (e.g. in the event that previous pairing information remains intact). In other instances it may be necessary to re-pair the items to each other; in some cases, this may be done automatically; in other cases, data entry or some other registration procedure may need to be performed.

It is thus noted that in some instances, a sensor module may be out of contact with a base unit, and/or an integrated sensor module/base unit may be out of contact with the operating circuitry of an aerial lift, e.g. for a short period of time. Another scenario in which this may occur is if a base unit is powered by an auxiliary power circuit of an aerial lift with the auxiliary power circuit not being activated until the operator has been authenticated e.g. by a badge reader. In such an instance, a sensor module (which may have been in a low-power-consumption or deep-sleep state that can be exited e.g. upon the operator manipulating a gated hook of the fall-protection safety apparatus in the manner described previously) may regain full operation, and may sense that a proper connection of the gated hook to the operator's harness has been established, before the base unit regains full operation. A similar situation may develop in any instance in which a sensor module begins to acquire data (e.g. detects that a connection has been established) before a base unit is fully powered on, or before an aerial lift is fully powered on, regardless of the specific cause.

To allow for most efficient functioning of the fall-protection monitoring system in the event of a loss or absence of communication, in some embodiments a sensor module and/or a base unit may be configured to store data (of any type, including e.g. raw data, partially processed data, fully processed data, one or more first positive signals, status information on components or subsystems of the sensor module and/or base unit itself, and so on) on-board the sensor module and/or base unit. In some embodiments, this data may be stored on-board until communication is established or re-established, at which point the stored data can be transmitted. (Similar arrangements can be provided in the case of communication via a telemetry network, and communication interruptions thereof)

Galvanically Isolated Connections

In some embodiments, it may be advantageous to use a wired connection between the base unit and the control circuitry of the order picker to send the at least one first positive signal (e.g., in analog form) from the base unit to the order picker control circuitry, rather than using a wireless/digital connection such as e.g. Bluetooth Low Energy. In some embodiments of this type, this may be done in a way that galvanically isolates the circuitry of the base unit from the control circuitry of the order picker. By galvanic isolation is meant that there is no direct current flow between the circuitry of the base unit and the circuitry of the order picker.

A wired, but galvanically isolated, connection can be achieved by equipping the base unit 60 with a galvanic isolation interface 61 (denoted in generic representation in FIG. 1) through which the base unit can receive signals from a source outside the base unit (and, in some embodiments, can send signals to a destination outside the base unit) in a galvanically isolated manner. In one exemplary arrangement, a galvanic isolation interface can comprise a solid-state relay that acts in concert with an input line (which will be referred to herein as line 1) from the order picker control circuitry and an output line (which will be referred to herein as line 2) that returns from the base unit to the order picker control circuitry. The order picker control circuitry can be configured to send a constant voltage V (of any desired value, e.g. 1, 2, 4, 8, 16, 32, or 60 volts) along the input line 1 to the solid-state relay. The input line 1 will be maintained at this constant voltage V by the order picker control circuitry. The solid-state relay can be configured so that the sending of a first positive signal from the base unit to the order picker occurs, under certain circumstances, by way of the solid-state relay assuming a "closed" configuration that allows the constant voltage signal V to be returned to the order picker on output line 2. Thus, the solid-state relay may comprise a so-called "normally-open" switch that remains open (thus not allowing the incoming voltage V on input line 1 to be returned to the order picker on output line 2) unless the base unit receives connector status information from the sensor module indicating that the connector appears to be properly connected to the user's harness in the manner described earlier herein. Upon receiving an indication that the connector does appear to be properly connected, the solid-state relay (switch) will transition to the "closed" configuration in which it allows the incoming voltage V to be returned to the order picker. This voltage V, as returned to the order picker on output line 2 will be interpreted by the order picker circuitry as being a first positive signal that (e.g. along with other positive signals) will cause the order picker circuitry to enable at least the vertical-motion function of the order picker.

In some convenient embodiments, a solid-state relay as described above may rely on a so-called opto-isolator, which comprises a light source (e.g. an LED) and a light detector (e.g. a photodiode or phototransistor). Briefly described, an appropriate incoming signal (e.g. a "connected" signal from the sensor module) will cause the light source to emit light. The light detector will detect the light and will cause the relay to transition to a configuration in which the voltage V can be returned along the output line 2, without there ever being a direct electrical connection between the incoming signal and the output line 2.

Equipping the base unit with a galvanic isolation interface can advantageously allow the fall-protection monitoring system to be compatible with any order picker (or aerial lift, in general) regardless of the voltages that the order picker control circuitry may utilize. That is, a solid-state relay as described herein may be able to accept any incoming voltage V along an input line 1, and to return the voltage V along an output line 2, regardless of the actual value of the voltage, as long as the voltage is in a suitable overall range, e.g. from 0 to 60 Volts.

Many variations of the above-presented exemplary arrangements are possible. For example, rather than a solid-state relay being of the normally-closed type as described above, the relay may be of a normally-open type. In such an arrangement, the relay will remain in a closed configuration in which it receives an incoming voltage V on input line 1 and returns it to the control circuitry of the order picker on output line 2, unless the base unit receives connector status information from the sensor module that indicates that the connector appears to be properly connected to the user's harness. If such an indication is received, the relay will now transition to an open configuration such that the voltage V will no longer be returned to the control circuitry of the order picker. In such a case, it is the ceasing of a previously-existing return voltage V that the order picker control circuitry interprets as an aforementioned first positive signal. (Such a signal thus will still be considered to be a "positive" signal as defined herein.)

In some embodiments a solid-state relay may be set up so that rather than choosing between returning a voltage V (e.g., 7 Volts) and "returning" a zero-voltage signal along the output line, the relay may, in general, choose between returning a high voltage signal and a low voltage signal. In other words, the low voltage need not necessarily be exactly zero volts. Any such system may be configured so that the high voltage corresponds to a first positive signal or so that the low voltage corresponds to a first positive signal. Various arrangements of this type are possible; all that is needed is that the control circuitry of the order picker be configured to recognize what returned voltage corresponds to a positive signal as defined herein, and what voltage corresponds to the absence of a positive signal.

In some embodiments a base unit may comprise multiple solid-state relays, each receiving an incoming voltage V e.g. along input line 1, and returning it (or not returning it) to the order picker along an output line. Thus, following up on the above examples, in some embodiments a base unit may comprise a normally-open solid-state relay that will return a voltage V along output line 2 as a first positive signal. The base unit may comprise another, normally-closed solid-state relay that will provide a supplemental first positive signal to the order picker by ceasing to return a voltage V along output line 3. In various embodiments, the order picker control circuitry may be configured so that it has to receive a first positive signal on line 1, a first positive signal on line 2, or both, to enable the desired function(s) of the order picker. Having two (or more) such complementary pathways along which first positive signals must be sent to enable the desired function(s) of the order picker, may provide redundancy and robustness to the interlocking system.

In various embodiments, additional output lines may be provided for any desired purpose. Thus in some instances, a base unit may be equipped with a multi-pin connector, e.g. a 2, 4, 8, or 10-pin connector, for this purpose. (Such a multi-pin connector is an electrical connector and is not to be confused with connector 30 that is a mechanical connector (i.e. a hook/carabiner)). Such a multi-pin connector of the base unit can be connected to a suitable electrical cable that is electrically connected to the order picker control circuitry so that at least one line of the cable and connector can serve as an input line that receives input from the order picker in the form of a constant voltage V, and so that at least one line can serve as an output line that can return the constant voltage V to the order picker. In various embodiments, one or more additional output lines may be dedicated to any of the system-readiness parameters that were described previously herein.

In an exemplary arrangement, a multi-pin connector and compatible electrical cable may be used to handle multiple first positive signals, with the connector and cable accommodating lines that are allocated as follows:

Line 1: Input line to receive constant voltage V from order picker control circuitry.

Line 2: Output line with normally-open switch, to return the constant voltage V to the order picker control circuitry if the sensor module indicates that connector 30 appears to be connected to the harness.

Line 3: Output line with normally-closed switch, to cease returning the constant voltage V to the order picker control circuitry if the sensor module indicates that connector 30 appears to be connected to the harness. (Lines 2 and 3 are the type of complementary, redundant output lines described above, noting that the ordering of the two output lines may be reversed if desired.)

Line 4: Output line to return (or not) the constant voltage V to the order picker depending on the results of a readiness check of the sensor module.

Line 5: Output line to return (or not) the constant voltage V to the order picker depending on the results of a readiness check of the base unit.

Line 6: Output line to return (or not) the constant voltage V to the order picker depending on the assessed remaining life of the internal battery that powers the sensor module.

Line 7: Output line to return (or not) the constant voltage V to the order picker depending on the results of a readiness check of an energy absorber of the fall-protection apparatus.

Still other lines, if available, may be dedicated to any use as desired. In various embodiments, other lines may be additional input lines, may be additional output lines, or may serve both purposes. In some embodiments one or more lines may be GPIO (general-purpose input/output) lines to be used for any purpose as desired. In some embodiments, one or more lines may be configured to receive information from the order picker regarding the height that the platform is currently raised to, e.g. for purposes discussed earlier herein. One or more input and/or output lines may be configured to allow the fall-protection monitoring system to interact with site telemetry, with a central monitoring station, and so on, without necessarily having to do so via the operating circuitry of the order picker. This may be used, for example, to provide a central monitoring station with information on the readiness and state of the fall-protection apparatus and monitoring system.

The signals sent on lines 3 and above will correspond to various supplemental first positive signals as described earlier herein. Other supplemental first positive signals may be used, e.g. in order to interlock the vertical-motion function of the order picker as a function of any other parameter monitored by the fall-protection monitoring system. Although not specified in the above examples, lines 4 and greater may be used with solid-state relays that comprise switches that are normally-open, or normally-closed, as desired. A normally-open configuration, or a normally-closed configuration may be desired in various instances. Any first positive signals, including supplementary first positive signals, that are associated with a particular parameter (e.g. remaining battery life) may be sent in an arrangement using complementary line pairs, e.g. with one line operating via a normally-open switch and another, companion line operating via a normally-closed switch (as with exemplary lines 2 and 3 listed above). This can provide redundancy in monitoring and reporting on the particular parameter that this pair of signals are associated with.

In the above exemplary arrangements, all of the output lines (i.e., line 2 through line 7 and any additional lines if present) work from a single, common input line 1. That is, an incoming voltage V that arrives via a single input line 1 is returned, or not returned, on the various output lines. However, in some embodiments, one or more output lines may each work from a separate input line that is dedicated to working only with that output line. It is also noted that in some embodiments (e.g. if the base unit and the sensor module are integrated with each other), a combined self-check of both entities may be performed and the combined results reported, so that only one output line may be needed for such purpose. It is further noted that the line number designations (at least for the output lines) may be arbitrary designations in terms of the ordering and location of the actual physical lines.

The above discussions reveal that in some embodiments, a fall-protection monitoring system may be configured to send (or not send) multiple first positive signals to the control circuitry of an order picker. In various embodiments, the total number of first positive signals may range from 1 up to 4, 6, 8, 10, or more. As discussed earlier herein, the order picker will also receive at least one additional positive signal from a safety apparatus of the order picker itself. Often, the order picker may receive e.g. two, three, four, or more such additional positive signals (e.g., from an OPC switch, a safety gate, an operator authentication device, etc.). It will thus be appreciated that in some embodiments, the control circuitry of an order picker must be configured to receive numerous positive signals, e.g. up to 5, 10, 15 or even more. In many embodiments, the herein-described first positive signals that originate from the fall-protection monitoring system may be input into the control circuitry of the order picker in similar manner as the additional positive signals that originate from safety apparatus of the order picker itself. For example, all such positive signals may enter the control circuitry via a designated multi-pin connector or by any suitable arrangement of electrical leads or the like.

It will be understood that although the detailed example presented above pertained to a multichannel wired connection, in other embodiments, wireless communication between a base unit and an aerial lift (whether performed by e.g. short-range wireless, through a telemetry network, or through a cellular network) may similarly involve multiple channels that allow multiple, e.g. independent, signals to be transmitted, received, and processed. Furthermore, the discussions above make it clear that communication between any and all of a base unit, a sensor module, and an aerial lift may take place by any suitable method, whether by hard-wire, by a short-range wireless arrangement such as e.g. Bluetooth or Bluetooth LE, by way of a telemetry network, and/or by way of a cellular network. In some embodiments, one such method may be a primary communication method with another method being a back-up method. (For example, a primary mode of communication between a base unit and an aerial lift may be via short-range wireless, with communication via a telemetry network to which the base unit and aerial lift both belong, and/or communication via a cellular telephone network, serving as a backup, e.g. with the system being configured to automatically switch to a backup communication method in case of a problem with the primary communication method.)

The control circuitry of the order picker may be configured to enable or disable various functions of the order picker based on the first positive signals (including supplemental first positive signals) and the additional positive signals, considered as a set. In one simple exemplary arrangement, the control circuitry may not enable the vertical-motion function of the order picker unless all of the expected first positive signals and additional positive signals are received. For example, if the control circuitry is set up to (potentially) receive five first positive signals and three additional positive signals, the vertical-motion function of the order picker may not be enabled unless all eight of these positive signals are received.

However, in some embodiments, the control circuitry of the order picker can include logic circuits that allow more complex combinations of positive signals and the absence of positive signals to be taken into account when determining whether to enable various functions of the order picker. For example, if the order picker receives three particular first positive signals (and fails to receive two other first positive signals) and similarly receives two additional positive signals (and fails to receive a third additional positive signal), one or more functions of the order picker may be enabled, while one or more other functions may be disabled.

Such logic circuits may be set up in any suitable way, e.g. in the form of a lookup table that encodes the desired Boolean logic (e.g. in the form of a truth table), by way of suitable logic gates and combinations thereof, decision trees, and so on. In some embodiments, these settings and configurations may be pre-installed into the order picker and unchangeable. In other embodiments, at least some such settings (e.g. that dictate actions to be taken in terms of functions enabled and not enabled, in response to a particular combination of positive signals received and not received) may be user-selectable and/or may be updated e.g. by way of a firmware update to the order picker control circuitry.

The control circuitry of an aerial lift, e.g. logic circuits thereof, may be set up to handle more complex scenarios. Such scenarios may arise in a variety of circumstances, for example a training situation where an aerial lift is configured e.g. with two SRLs so as to accommodate two operators. Other complex scenarios may arise in the case of an operator using two harness-mounted personal SRLs (e.g. a twin-leg personal SRL arrangement, discussed in further detail later herein), only one of may need to be detected as connected to an anchorage of the aerial lift at any given time. In some cases, quite complex scenarios may be present, e.g. in the case of a multi-occupant aerial lift (e.g. a large-capacity mobile elevating work platform, for example a large-capacity scissor lift) that can accommodate e.g. up to six or more persons (and that may comprise a commensurate number of anchorages). Any scenario may be more complex e.g. if a fall-protection monitoring system is configured to operate in cooperation with an operator authentication device (e.g. a badge reader) of the general type described earlier herein. In such a case, control circuitry of the aerial lift (and/or, circuitry in the fall-protection monitoring system that determines whether to transmit one or more first positive signals) may be configured so that it must detect a number of connections (e.g. to anchorages of the aerial lift) commensurate with the number of persons identified by the operator authentication device as being present on the aerial lift, in order to enable at least a vertical-motion function of the aerial lift. It will be appreciated that numerous and varied complex scenarios of these and other types may be envisioned. To accommodate such scenarios, the control circuitry may include logic circuits equipped with one or more truth tables as described above, and/or configured with one or more complex decision trees, sets of Boolean logic operators (e.g. AND. OR. NOT. NAND. NOR. XOR gates and varieties and combinations thereof), and so on.

In some embodiments, processing circuitry that makes decisions to enable or disable various functions of an aerial lift based on first positive signals (including supplemental first positive signals), additional positive signals, and so on, may be resident at a remote location, e.g. at a central monitoring station. Instructions may then be sent from this remote location to the aerial lift per the findings of the remotely-located processing circuitry. However, in some embodiments it may be preferable to have such decisions made locally, on the aerial lift itself, e.g. so that a temporary communication dropout between the aerial lift and the central monitoring station will not affect the functioning of the aerial lift. In some embodiments, processing circuitry at a central monitoring station may be set up in parallel to that on the aerial lift, e.g. so that the central monitoring station can serve as a backup or can issue a notification in the event that the backup circuitry detects a potential issue with the functioning of the primary circuitry; or, in general, with any aspect of the aerial lift and its associated fall-protection monitoring system.

It was mentioned earlier herein that if the fall-protection safety apparatus comprises an energy absorber, in some embodiments the energy absorber may be equipped with one or more sensors to detect e.g. whether any segments of the energy absorber have become at least partially separated from each other, in order to provide an assessment of the readiness of the energy absorber. In some embodiments, arrangements of this general type may be used for a different purpose (whether or not such arrangements are also used for a readiness assessment). Specifically, in some embodiments an energy absorber may be equipped with one or more sensors in order to provide an indication that a user fall may have occurred. For example, a sensor reading that implies that sufficiently large-scale separation of segments of a shock-pack type energy absorber has occurred, may be taken as an indication of a possible user fall. Such an indication may be used to interlock at least the vertical-elevation function (and/or any other function) of the order picker in the general manner previously described. Such an indication may also cause an notification to be issued (whether broadcast locally, and/or to a central monitoring station) that a possible user fall may have occurred.

If fall detection is desired, other sensors and sensing arrangements may be provided on various components of the fall-protection apparatus, as appropriate. For example, one or more sensors may be configured to monitor the rotation speed and/or acceleration of the previously mentioned reel 53 upon which the safety line 52 is wound. A sufficiently high speed and/or acceleration having been observed may be taken as an indication that a user fall may have occurred. Or, a load cell or similar sensor may be used to monitor the load on safety line 52. A sufficiently high load having been observed may be taken as an indication that a user fall may have occurred. Any of the herein-described sensors, alone or in any combination, may be used for such purposes. In some instances, a finding that a user fall may have occurred may also be taken as an indication that at least some component of the fall-protection apparatus is no longer in a ready-for-use condition. Thus, the performing of sensing for purposes of detecting a possible user fall may have some overlap with the performing of sensing in order to detect a state of readiness of the fall-protection apparatus and the fall-protection monitoring system.)

In some embodiments, a sensor module of a fall-protection monitoring system may be configured with one or more sensors that are capable of detecting more than merely the presence or absence of an item or portion thereof. By way of a particular illustration, such a sensor, as present on a connector, may be able to do more than simply report a yes/no indication of whether or not the connector appears to be attached to a detectable (e.g. metal) D-ring. Rather, the sensor may be able to provide an indication of whether the connector appears to be attached to a D-ring or appears to be attached to some other detectable item (such as e.g. a metal component of a docking station). Additionally, such a sensor may be able to distinguish both of these from a situation in which the connector does not appear to be attached to any detectable item.

In some embodiments, such arrangements may be enhanced by equipping one or more designated items with an add-on entity that is purposefully configured to alter the inductive signature of the item in a predetermined manner. With particular regard to inductive sensing, certain materials (e.g. ferrites) may be particularly suitable for purposes of altering the inductive signature of a metal item. Such materials may be, for example, disposed in a shroud, a wrap, a molded item, or the like, to form an add-on entity which may be e.g. mounted on or otherwise disposed on or near the metal item whose inductive signature is desired to be modified. Multimodal sensing and arrangements made possible thereby, are discussed in detail in U.S. Provisional Patent Application 62/872,545 and in the resulting PCT patent application published as WO 2021/005467, both of which are incorporated by reference in their entirety herein.

Discussions so far have primarily focused on determining whether a connector appears to be connected to a harness of an operator of an aerial lift by a combination of sensing the presence/absence of an item (e.g. a D-ring) in an opening of a hook and sensing the secured/unsecured status of a gate of the hook. However, the general arrangements disclosed herein, in which an aerial lift is interlocked with a fall-protection apparatus by way of a fall-protection monitoring system, may be used with any sensing method or combination thereof. For example, a sensing system based on one or more cameras along with image-processing circuitry may be able to determine whether a connector of a fall-protection apparatus appears to be connected to a D-ring of a harness of an operator of the aerial lift versus e.g. hanging free from an SRL housing or docked in a docking station. By "camera" is meant any appropriate image-acquisition device; such a device is not necessarily limited to acquiring visual-wavelength light but rather could be configured e.g. to capture infrared radiation. Any suitable number of cameras may be used. In some embodiments, at least one such camera may be positioned generally rearward of the position at which the user stands on the operator-support platform of the aerial lift, so that the camera can get an unobstructed view of the dorsal D-ring of the operator's harness to determine whether the connector appears to be connected to the dorsal D-ring. Thus for example, a camera may be positioned at a rearward end of an overhead guard 9 of the aerial lift, aimed generally forward and downward toward the general location at which the dorsal D-ring is expected to be found during ordinary use of the aerial lift.

In some embodiments, such a camera-based sensing system may rely on markers (e.g. passive markers such as retroreflective indicia, or active markers in the form of LEDs) provided on one or both of the connector of the fall-protection apparatus and a D-ring of the user's harness. In other embodiments, a markerless system may be used. Any such sensing system will comprise image-processing circuitry that is configured to identify a connector, to identify a D-ring, and to ascertain whether the connector appears to be connected to the D-ring. Here and elsewhere, terminology such as "connected to a D-ring" encompasses situations in which a connector of a fall-protection apparatus is directly connected to the D-ring, and also encompasses situations in which the connector is connected to an item (e.g. an extender) that is itself connected to the D-ring (noting further that, as emphasized earlier herein, the term "D-ring" generically encompasses any suitable item that is attached to a user's harness so that a connector of a fall-protection apparatus can be connected thereto).

In some embodiments, such a camera-based sensing system may be used as an adjunct to, or as a replacement for, a sensor module of the general type described earlier herein (comprising one or more sensors located on the connector itself). It is thus emphasized that the general arrangements disclosed herein for monitoring whether a connector of a fall-protection apparatus appears to be connected to a harness of a user of an aerial lift, are not necessarily limited to any one sensing method or combination of sensing methods. It can also be appreciated that a fall-protection monitoring system as disclosed herein (e.g. comprising a camera-based sensing system) need not necessarily have any component that is mounted on, or directly connected to, the fall-protection apparatus that the monitoring system is used to monitor. Rather, in some embodiments some or all of the components of a monitoring system (e.g. a set of cameras and associated image-processing hardware) may be resident on the aerial lift rather than installed in or on the fall-protection apparatus itself.

In some embodiments, a camera-based sensing system may be configured to serve as an Operator Presence Control (OPC) switch of the general type described earlier herein. (This may be the case regardless of whether the camera-based sensing system also performs the above-described function of monitoring whether the connector of the fall-protection apparatus appears to be connected to the user's harness.) That is, one or more cameras and associated processing circuitry may be configured to ascertain whether a human user/operator is present on the operator-support platform of the aerial lift, whether the operator appears to be standing vertically, facing forward, etc. In other words, the sensing system may provide an indication of whether the operator appears to be in an attentive posture that indicates that the operator is in an appropriate condition for operating the aerial lift. Still further, the sensing system may include at least one camera that faces generally toward the operator's face and serves, in conjunction with associated circuitry to monitor whether the operator has his or her eyes open.

Beyond this, in some embodiments such a sensing system may comprise at least one thermal imaging camera (or, in general, an infrared sensor) that may provide an indication of whether the operator appears to be running a fever. In some embodiments such a sensing system may comprise motion-capture functionality and may be configured to provide an indication of whether the operator is moving (or not moving) in such a manner as to indicate that the operator may be impaired, suffering from a medical condition, and so on. Still further, in some embodiments such a sensing system may comprise at least one camera, and associated circuitry, that is configured to perform facial recognition in order to serve as an operator authentication device. Such an authentication device can be configured to identify a person that is standing on the operator-support platform and in particular to confirm that the person is trained and authorized to operate the aerial lift. The sensing system may thus cause a tertiary positive signal to be sent to the control circuitry of the order picker that allows the aerial lift to be operated. And, in some embodiments, such a sensing system may be configured to detect that two (or more) persons are present on the operator-support platform of an aerial lift, and to provide this information to the control circuitry of the aerial lift so that the aerial lift will accordingly enter a "multi-user" mode.

In a similar manner, a camera-based sensing system (or, in general, any sensing system, operating via any suitable mechanism) may be configured to ascertain whether any person (e.g. a single operator) is present on operator-support platform 2. (Any such system may correspond to an operator-detection module as previously described herein.) In some embodiments, some of the functions described earlier herein may be put on standby or otherwise not carried out when an operator is not detected as being present. If an operator-detection module is present, it may be used in combination with other systems for various purposes. For example, if an aerial lift is equipped to monitor its vertical elevation, and if an operator-detection module reports that a user is no longer detected as being on the operator-support platform at a time at which the lift is elevated, the aerial lift (and/or the fall-protection monitoring system) may issue a notification of a possible fall event. In various embodiments, an operator-detection module may rely e.g. on one or more infrared sensors, ultrasonic sensors. LIDAR sensors, and so on, instead of, or as an adjunct to, a camera-based sensing system.

In various embodiments, any of the above-described arrangements or combinations thereof may be employed, noting that in many embodiments some or all of the cameras of such a system will typically be resident on the aerial lift rather than on the fall-protection apparatus. Thus in various embodiments, an aerial lift may be provided with one or more camera-based sensing systems that perform any or all of the functions of an OPC switch, an operator authentication device, and so on, regardless of whether the camera-based sensing system also serves as a fall-protection monitoring system.

In some embodiments, the at least one sensor module of the fall-protection monitoring system may comprise at least one sensor that is in the form of an accelerometer, e.g. a multi-axis accelerometer. In addition to other possible uses discussed previously herein, an accelerometer may augment the previously-discussed sensor-obtained information with further information e.g. as to the angle that the connector is residing at, the motions that the connector is undergoing, and so on. In some circumstances, such additional information may e.g. provide additional confirmation that the connector is e.g. attached to a D-ring of a harness that is currently worn by the human user of the aerial lift. In other words, the attitude at which a connector resides, and/or the motions that the connector undergoes, may be useful in confirming that the connector is residing, and/or moving, in a way that is characteristic of that expected when the connector is connected to a D-ring of a harness that is being worn by a person standing on the operator-support platform. It is noted that such additional information may not be needed in most situations and that the presence and use of an accelerometer in this manner should be regarded as an optional feature.

As noted previously, in some embodiments a fall-protection monitoring system may perform an additional function of broadcasting one or more notifications. In some embodiments, this may be performed by a notification unit that is co-located with the base unit. In other embodiments, a notification unit can be provided that is separate from the base unit and is located e.g. on a vertical wall of the aerial lift (or in some other easily visible location) and that can be instructed by the base unit to broadcast a visible and/or audible notification. That is, in some embodiments a notification unit may be separated from the base unit and may be present solely for the purpose of broadcasting a notification rather than comprising any other functionality. Any such notification unit can be configured (e.g. shaped and positioned) to ensure that it is easily visible but does not interfere with the vision of the operator of the order picker. Any such notification unit (comprising e.g. a string of LED lights) may be directly wired to the base unit, or the base unit may wirelessly operate the notification unit. It is not strictly necessary that an audible signal be broadcast from the same location as a visible signal; so, if desired, the monitoring system may comprise two physically separate notification systems, e.g. one audible and one visible.

Any such notification may be e.g. a Not Ready warning notification, meaning a notification that the connector of the safety apparatus does not appear to be connected to the user's harness. Or, it may be a Ready notification, meaning a notification that the connector does appear to be connected to the user's harness. Any such notification need not use specific words such as e.g. "Not Ready"; rather, a notification may take any suitable form whose meaning will be readily apparent to a trained user of the aerial lift and of the fall-protection system.

In some embodiments, the base unit may be configured to broadcast only a local notification (e.g. a visible signal and/or an audible signal). In some embodiments the base unit may be configured to provide a notification to a remote unit, e.g. to a smart phone or to a central station or hub at which the condition of numerous fall-protection systems and/or aerial lifts may be monitored. Such arrangements may make use of any desired communication method, protocol, or the like, including any of those mentioned below. Of course, in various embodiments, any of the conditions that are monitored by the herein-disclosed systems, may be e.g. logged, reported e.g. to a central hub or monitoring station for tracking purposes, and so on. In particular, the fall-protection monitoring system may, e.g. in response to a self-check, send a notification that some aspect or component of the monitoring system (or of the fall-protection apparatus) needs to be inspected, maintained, or serviced.

Any notification arrangement may be used in combination with any interlocking arrangement as described herein. For example, an order picker might be configured so that the order picker can be elevated e.g. up to 1 meter in the absence of a first positive signal indicating that the user's D-ring appears to be connected to a connector of the fall-protection apparatus, but with the system issuing a notification when the order picker reaches e.g. 0.5 meter in height. In some embodiments, the system may issue increasingly strident warnings (e.g. lights that blink brighter, in a different color, and/or at a faster rate; audible signals of increasing loudness, and so on) as the elevation height increases; in particular, as the height limit is approached. As discussed in detail earlier herein, once the order picker reaches the predetermined height limit, the interlocking system will prevent the order picker from being elevated any higher until the appropriate first positive signal(s) and additional positive signal(s) are received.

In some embodiments, a fall-protection system can optionally include a dedicated docking station to which connector 30 can be docked (i.e., connected) when not connected to the harness of a user of the aerial lift. In some embodiments a docking station can be a separate entity from base unit 60. In other embodiments a docking station can be integrated with base unit 60. In some embodiments a docking station may be a purely mechanical apparatus that does not participate, either actively or passively, in the fall-protection monitoring system. In other embodiments a docking station may be configured (e.g. equipped with a sensor module) to participate in the fall-protection monitoring system. That is, the presence of a docking station (whether integrated with base unit 60, or provided as a separate item at a separate location on the aerial lift) to which a connector 30 is to be docked, offers another possible way in which the condition of the connector may be monitored.

Discussions so far herein have primarily concerned SRLs comprising a housing that is attached to an overhead anchorage and that comprises a safety line that is extendable from the housing, with the distal end of the safety line comprising a connector that can be connected to a D-ring of a harness worn by a user of an aerial lift. However, the arrangements disclosed herein can also be used with a so-called personal SRL (rather than the above, which may be referred to as an overhead-mounted SRL). By this is meant an SRL that comprises a housing that is attached to the harness of a user and that comprises a safety line that is extendable from the housing, with the distal end of the safety line bearing a connector that can be attached to an anchorage of the aerial lift. (With a personal SRL, the proximal end of the safety line, that is connected e.g. to a drum or reel within the housing of the SRL, will be considered to be connected to the harness.) In such a case, the descriptions herein will still apply, except that the monitoring system will be configured to determine whether the connector of the safety line of the personal SRL appears to be connected to an anchorage, rather than to the user's harness. All descriptions and discussions herein can be adjusted accordingly. In some embodiments, a user's harness may be equipped with two personal SRLs (sometimes referred to as a twin-leg or 100% tie-off arrangement), e.g. so that a person can remain tied-off while transitioning from an aerial lift to an elevated work platform. In such a case, the connectors of both SRLs may be equipped with a sensor module and/or base unit.

An anchorage of an aerial lift that is configured for use with a personal SRL can take any suitable form, whether such an anchorage is rigidly fixed to the aerial lift (or is a component of the aerial lift itself), or takes the form of e.g. a D-ring at the end of a tether that is attached to the aerial lift. In some embodiments, such an anchorage may be overhead mounted, e.g. in the form of a tether that is attached to an overhead guard of the aerial lift. However, in some embodiments (depending e.g. on the type and design of the particular aerial lift, the anchorage locations offered by the aerial lift, and so on), such an anchorage may be positioned e.g. at knee height or possibly lower, noting that any such anchorage and SRL must be positioned, configured and used in compliance with all applicable laws, rules, codes, standards, and so on. In applying a monitoring system as disclosed herein to a personal SRL, the sensor module and base unit of the monitoring system (whether as separate units or integrated together) may be disposed in any suitable location, whether on or near an anchorage, on a connector at the end of the safety line of the SRL, and so on.

Most discussions herein have so far concerned an arrangement in which a connector (e.g. a gated hook) at an end of a safety line of an SRL is equipped with a sensor module (in some embodiments, with an integrated sensor module and base unit) configured to detect the presence of an item (e.g. a D-ring that is attached to a fall-protection safety harness, or an anchorage) that is captured by the connector. In various embodiments, such arrangements can be used with an overhead-mounted SRL, or with a personal SRL. In some embodiments, these arrangements may be reversed—that is, a sensor module may be located e.g. on a D-ring or an anchorage, with a connector (e.g. a gated hook at an end of a safety line of an SRL) being the item that is detected by the sensor module as the D-ring or anchorage is captured by the connector. In such arrangements, the descriptions and characterizations herein still apply, with the connector, and the item connected, simply being swapped.

Although discussions herein have primarily concerned self-retracting lifelines (SRLs), it will be understood that the arrangements and methods disclosed herein may be applicable to any fall-protection safety apparatus that is suitable for use with an aerial lift, e.g. an order picker. Such fall-protection apparatus may take the form of, for example, a safety line that is in the form of a lanyard that is not necessarily extendable from, and retractable into, a housing in the manner of an SRL. Some such lanyards may include products (often referred to as positioning lanyards) that provide fall-restraint rather than fall-arrest. It is thus emphasized that the arrangements and methods disclosed herein encompass fall-protection apparatus that provide fall-restraint, rather than being limited e.g. to only such fall-protection apparatus as provide fall-arrest. In some embodiments, a lanyard may include at least one energy absorber (e.g. a tear strip or the like) configured to dissipate the energy in the event of a fall; such lanyards are often referred to as energy-absorbing lanyards. The arrangements and methods disclosed herein are thus understood to be applicable, in various embodiments, to any such lanyards and to all such fall-protection apparatus in general.

Aerial Lifts

Although discussions herein have primarily concerned order pickers as a particular example of an aerial lift, it is emphasized that the arrangements and methods disclosed herein are applicable to any aerial lift (except for characterizations of features or modes of operation that do not apply for a particular type of aerial lift). In fact, the terms aerial lift and order picker are used somewhat interchangeably herein. It will thus be understood that the descriptions and characterizations herein will apply to aerial lifts in general, and to order pickers specifically (again, excepting features or modes that do not apply for a particular type of aerial lift).

As disclosed herein, the term aerial lift encompasses any powered (e.g. motorized, whether by electric power, internal combustion engine, fuel cell, etc.) apparatus that comprises an operator-support platform (whether open-sided, partially open-sided, or closed-sided) that can be moved at least in a generally vertical direction. In some embodiments (e.g. if the aerial lift is a cherry-picker or bucket truck) the platform may be movable in a horizontal direction and/or an angled direction rather than being limited to purely vertical movement. In many embodiments the entire aerial lift may be able to move horizontally; e.g. it may comprise a main body (e.g. a vehicle) that, in addition to supporting the vertically elevatable platform, is motorized and is steerable in a horizontal direction.

In various embodiments, an aerial lift with which a fall-protection apparatus and a fall-protection monitoring system as disclosed herein may be used, includes, in addition to the specific apparatus and categories already named, a so-called aerial work platform, a scissor lift, a reach truck (whether moving-carriage or moving-mast), a swing-reach truck, a turret truck, a motorized narrow-aisle truck (e.g. an OSHA Class II powered industrial truck), and so on. It is noted in particular that aerial lifts with which the herein-disclosed arrangements may be used, are not limited to single-occupant aerial lifts (e.g. an order picker configured to hold a single operator) or even two-occupant aerial lifts but rather may be used with multi-occupant aerial lifts e.g. of the general type referred to as aerial work platforms and mobile elevating work platforms. Some such lifts as conventionally available may not necessarily comprise a suitable position (e.g. an overhead guard) on which an anchorage for an overhead-mounted SRL housing can be provided. In such cases, other arrangements (e.g. a personal SRL in combination with a suitable anchorage) or modifications may be used.

A fall-protection monitoring system as disclosed herein may be supplied, and configured for use with an aerial lift, in any suitable way. This can involve any suitable combination of one or more components (e.g. a base unit) of the monitoring system being "permanently" installed on the aerial lift (e.g. being physically attached to, and hardwired into, the console of the aerial lift), while one or more other components (e.g. a sensor-module-equipped SRL) may be "permanently" or removably suspended from an overhead guard of the aerial lift, e.g. by way of a cab mount or a carabiner, with the SRL being detachable from the aerial lift under certain circumstances.

Such components may be installed onto the aerial lift at any stage of the manufacture and shipping of the aerial lift or at the stage of readying the aerial lift for use that occurs at an end-use location of the aerial lift; moreover, all components do not necessarily have to be installed onto the aerial lift at the same time, or at the same location. For example, base units may be installed into aerial lifts at the factory at which the aerial lift is manufactured. Or (particularly in the case of order pickers which are often used in large fleets that are maintained and serviced by special technicians), base units can be installed into compatible aerial lifts at the end-use location.

Fall-protection safety apparatus (e.g. SRLs) can be produced comprising connectors that are equipped with sensor modules as disclosed herein; in some embodiments, such fall-protection safety apparatus can be supplied to the aerial lift manufacturer who then dedicates a particular fall-protection safety apparatus to a particular base-unit-equipped aerial lift and ships these in combination to an end-use location. Or, in other embodiments, such a safety apparatus (e.g. an SRL) can be shipped directly to the end-use location and then installed on a particular base-unit-equipped aerial lift at the end-use location. In embodiments in which base units and sensor-module-equipped fall-protection safety apparatus are shipped in pairs of one base unit and one safety apparatus, each base unit and sensor module pair may be wirelessly pre-paired (e.g. via Bluetooth Low Energy) before being shipped (whether to an aerial lift manufacturer or to an end-use location). Or, in some embodiments the base units and sensor modules may be wirelessly paired with each other at the aerial lift manufacturer or at the end-use location (of course, the items may occasionally need to be wirelessly re-paired with each other at the end-use location, e.g. after a sensor module battery change, as noted earlier herein).

In some embodiments, a base unit and a sensor-module-equipped fall-protection safety apparatus (e.g. an SRL) may not necessarily be shipped as a designated pair in the manner described above. Rather, in some embodiments, base units and sensor-module-equipped fall-protection safety apparatus may be shipped separately. It is emphasized that even if base units and sensor-module-equipped fall-protection safety apparatus are shipped separately and are not paired with each other (whether in the sense of being designated to the same aerial lift, or in terms of wireless pairing) e.g. until they are at the end-use location, any such base units and sensor-modules that are configured to work together in the manner disclosed herein will be considered to form a fall-protection monitoring system as claimed herein, regardless of whether or not they have yet been brought together on a particular aerial lift.

The above discussions have made it clear that a fall-protection monitoring system as disclosed herein may be configured in multiple different ways. Some arrangements (e.g. in which a connector of a fall-protection apparatus is equipped with a sensor configured to detect a D-ring of a user's harness) may provide a "direct" indication that the connector appears to be attached to the D-ring and thus may provide a direct indication that the harness of an operator of an aerial lift appears to be connected to the safety line of the fall-protection apparatus. Other arrangements may provide a direct indication of some other status of the connector (e.g. an SRL housing may be equipped with a sensor that is able to provide a direct indication that the connector appears to be snugged against the SRL housing) and thus may provide an "indirect" indication that the connector does not appear to be connected to the operator's harness. It will thus be appreciated that the arrangements and methods disclosed herein may be used in a variety of ways and implementations, any of which may be used in combination.

It is emphasized that regardless of the functioning of any monitoring system of a fall-protection apparatus as disclosed herein, the user/operator of the aerial lift will be tasked with carrying out any appropriate steps (e.g. as required by applicable laws, rules, codes, standards, and/or instructions) e.g. to verify that the connector of the fall-protection apparatus is securely attached to a properly-donned fall-protection safety harness. Under no circumstances will the presence of any arrangement as disclosed herein relieve an operator of an aerial lift of the duty to follow all appropriate laws; rules; codes; standards as promulgated by applicable bodies (e.g. ANSI); instructions as provided by the manufacturer of the aerial lift; instructions as provided by the manufacturer of the fall-protection system; instructions as provided by the entity in charge of a facility in which the aerial lift is used, and so on.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein but to which no priority is claimed, this specification as written will control.

What is claimed is:

1. An aerial lift comprising:

a fall-protection safety apparatus installed on the aerial lift and comprising a safety line with a distal end comprising a connector configured to be connected to a safety harness worn by a user of the aerial lift, the aerial lift comprising a fall-protection monitoring system configured to determine whether the connector of the safety line appears to be connected to the safety harness of the user and the aerial lift comprising at least one additional safety apparatus in addition to the fall-protection safety apparatus;

wherein the aerial lift is interlocked with the fall-protection safety apparatus and with the at least one additional safety apparatus of the aerial lift so that in order for at least a vertical-motion function of the aerial lift to be enabled, control circuitry of the aerial lift must receive at least one first positive signal from the fall-protection monitoring system indicating at least that the connector of the safety line appears to be connected to the safety harness of the user; and, the control circuitry of the aerial lift must receive at least one additional positive signal from the at least one additional safety apparatus of the aerial lift indicating that the at least one additional safety apparatus of the aerial lift is in a ready condition;

wherein the fall-protection monitoring system comprises a base unit and comprises at least one sensor module mounted on the connector and configured to sense whether the connector appears to be connected to the safety harness and to transmit connector status information to the base unit that is indicative of whether the connector appears to be connected to the safety harness; and wherein the base unit is configured to receive the connector status information from the at least one sensor module and to send the at least one first positive signal to the control circuitry of the aerial lift if the connector status information received from the at least one sensor module indicates that the connector appears to be connected to the harness and to not send any first positive signal to the control circuitry of the aerial lift if the connector status information received from the at least one sensor module indicates that the connector does not appear to be connected to the harness.

2. The aerial lift of claim 1 wherein the at least one additional safety apparatus of the aerial lift comprises an operator presence control (OPC) switch that is configured so that when the OPC switch is in a condition indicative of active control of the aerial lift by the user of the lift, the OPC switch sends a primary additional positive signal indicating that the OPC switch is in a ready condition.

3. The aerial lift of claim 2 wherein the at least one additional safety apparatus of the aerial lift further comprises a safety gate apparatus comprising at least a first safety gate that is configured to be moved between a stowed position and a protective position;

wherein when the first safety gate is in its protective position it is disposed generally above a first lateral edge of the operator-support platform, wherein the safety gate apparatus is configured to send a secondary additional positive signal that the safety gate apparatus is in a ready condition when at least the first safety gate is in its protective position, and wherein in order for at least the vertical-motion function of the aerial lift to be enabled, the at least one first positive signal must be received from the fall-protection monitoring system, the primary additional positive signal must be received from the OPC switch, and the secondary additional positive signal must be received from the safety gate apparatus.

4. The aerial lift of claim 2 wherein the at least one additional safety apparatus of the aerial lift further comprises an operator authorization safety apparatus, and wherein in order for at least the vertical-motion function of the aerial lift to be enabled, the at least one first positive signal must be received from the fall-protection monitoring system, the primary additional positive signal must be received from the OPC switch, and a tertiary additional positive signal must be received from the operator authorization safety apparatus.

5. The aerial lift of claim 1 wherein the fall-protection safety apparatus comprises a self-retracting lifeline (SRL) comprising a housing, with a proximal end of the safety line of the fall-protection safety apparatus being connected to a drum that is within the housing of the SRL and is rotatably connected to the housing of the SRL and with the safety line being extendable out of the housing and retractable into the housing; and, wherein the housing of the SRL is attached to an overhead guard of the aerial lift, the overhead guard of the aerial lift being positioned generally vertically overhead of an operator-support platform of the aerial lift.

6. The aerial lift of claim 1 wherein the fall-protection monitoring system is configured to perform at least one self-check of at least one component of the fall-protection monitoring system and wherein the base unit is configured so that if the self-check indicates that the at least one component of the fall-protection monitoring system appears to be in a ready condition, the base unit will send at least one supplemental first positive signal, and wherein the control circuitry of the aerial lift is configured so that it must receive the at least one supplemental first positive signal from the fall-protection monitoring system in order for at least the vertical-motion function of the aerial lift to be enabled.

7. The aerial lift of claim 6 wherein the fall-protection monitoring system is configured to perform self-checks of first, second and third components of the fall-protection monitoring system and wherein the base unit is configured so that if the self-checks indicate that the first, second and third components of the fall-protection monitoring system all appear to be in a ready condition, the base unit will send three supplemental first positive signals, and wherein the control circuitry of the aerial lift is configured so that it must receive all three supplemental first positive signals from the fall-protection monitoring system for at least the vertical-motion function of the aerial lift to be enabled;

and, wherein the first self-checked component of the fall-protection monitoring system is the sensor module, the second self-checked component of the fall-protection monitoring system is the base unit, and the third self-checked component of the fall-protection monitoring system is at least one internal battery that powers at least the sensor module.

8. The aerial lift of claim 7 wherein the first self-checked component of the fall-protection monitoring system is the sensor module, the second self-checked component of the fall-protection monitoring system is the base unit, and the third self-checked component of the fall-protection monitoring system is the at least one internal battery that powers at least the sensor module.

9. The aerial lift of claim 1 wherein the fall-protection monitoring system is configured so that if the base unit of the fall-protection monitoring system receives connector status information from the at least one sensor module indicating that the connector appears to be connected to the harness, the fall-protection monitoring system will broadcast at least one Ready notification indicating that the connector appears to be connected to the harness, in addition to sending the at least one first positive signal to the control circuitry of the aerial lift.

10. The aerial lift of claim 1 wherein the control circuitry of the aerial lift is configured to receive the at least one first positive signal from the base unit of the fall-protection monitoring system through a wired connection with the base unit, the wired connection being configured so that the base unit of the fall-protection monitoring system is galvanically isolated from the control circuitry of the aerial lift.

11. The aerial lift of claim 1 wherein the aerial lift is configured so that in the absence of the at least one first positive signal from the fall-protection monitoring system and the at least one additional positive signal from the at least one additional safety apparatus, the aerial lift is unable to elevate from a first, lowered position but is still able to descend from an elevated position.

12. The aerial lift of claim 1 wherein the aerial lift is configured so that in the absence of the at least one first positive signal from the fall-protection monitoring system and the at least one additional positive signal from the at least one additional safety apparatus of the aerial lift, the aerial lift is unable to elevate from a first, lowered position, beyond a predetermined height that is 4.0 feet or less above the first, lowered position; and, wherein the aerial lift is further configured so that upon receiving of the at least one first positive signal from the fall-protection monitoring system and the at least one additional positive signal from the at least one additional safety apparatus, the aerial lift is able to elevate beyond the predetermined height above the first, lowered position.

13. The aerial lift of claim 1, wherein the aerial lift is an order picker.

14. A method of controlling the operation of the aerial lift of claim 1, the method comprising:

upon receiving at least one first positive signal from the fall-protection monitoring system indicating at least that the connector of the safety line of the fall-protection safety apparatus appears to be connected to the fall-protection safety harness of the user and receiving at least one additional positive signal from at least one additional safety apparatus of the aerial lift, enabling at least a vertical-motion function of the aerial lift;

and, upon the at least one first positive signal and/or the at least one additional positive signal not being received, or ceasing to be received, disabling at least the vertical-motion function of the aerial lift.

15. The aerial lift of claim 1 wherein the sensor module is located on the connector of the fall-protection safety apparatus, wherein the base unit is co-located with the sensor module on the connector of the fall-protection safety apparatus with the sensor module sending the connector status information to the base unit through a wired connection; and, wherein the base unit is configured to wirelessly send the first positive signal to the control circuitry of the aerial lift.

16. The aerial lift of claim 15 wherein the connector of the fall-protection safety apparatus comprises a gated hook and wherein the sensor module is installed in a housing fitted onto at least a portion of a main body of the gated hook.

17. The aerial lift of claim 1 wherein the sensor module comprises a sensor that comprises an RFID reader configured to detect the presence of an RFID tag disposed at or on a D-ring of the safety harness worn by the user, the fall-protection monitoring system being configured so that detection of the RFID tag by the RFID reader provides the indication that the connector of the safety line of the fall-protection safety apparatus appears to be connected to the safety harness, which indication causes the fall-protection monitoring system to send the at least one first positive signal to the control circuitry of the aerial lift.

18. The aerial lift of claim 1 wherein the fall-protection safety apparatus comprises a self-retracting lifeline (SRL) comprising a housing, with a proximal end of the safety line of the fall-protection safety apparatus being attached to a drum that is within the housing of the SRL and is rotatably connected to the housing of the SRL, with the safety line being extendable out of the housing and retractable into the housing, with the connector of the fall-protection safety apparatus being attached to a distal end of the safety line, and with the housing of the SRL being secured to an anchorage of the aerial lift.

19. The aerial lift of claim 1 wherein the aerial lift is configured so that in the absence of the at least one first positive signal from the fall-protection monitoring system and the at least one additional positive signal from the at least one additional safety apparatus of the aerial lift, the aerial lift is unable to elevate from a first, lowered position but is still able to descend from an elevated position.

20. The aerial lift of claim 1 wherein the aerial lift is configured so that in the absence of the at least one first positive signal from the fall-protection monitoring system and the at least one additional positive signal from the at least one additional safety apparatus of the aerial lift, the aerial lift is unable to elevate from a first, lowered position beyond a predetermined height that is 4.0 feet or less above the first, lowered position; and, wherein the aerial lift is further configured so that upon receiving of the at least one first positive signal and the at least one supplemental first positive signal from the fall-protection monitoring system, the aerial lift is able to elevate beyond the predetermined height above the first, lowered position.

21. The aerial lift of claim 1 wherein the fall-protection monitoring system of the fall-protection safety apparatus and the control circuitry of the aerial lift are configured so that there is two-way communication therebetween and so that the control circuitry of the aerial lift sends information to the fall-protection monitoring system regarding the elevation of the aerial lift.

22. The aerial lift of claim 1 wherein the connector of the fall-protection safety apparatus comprises a gated hook with the sensor module being installed in a housing fitted onto at least a portion of a main body of the gated hook, and wherein the safety line of the fall-protection safety apparatus comprises a shock absorber.

23. The aerial lift of claim 1 comprising a fall-protection system that comprises the fall-protection safety apparatus, the fall-protection monitoring system, and the safety harness worn by the user of the aerial lift, the connector of the safety line of the fall-protection apparatus being connected to the safety harness worn by the user and a housing of the fall-protection safety apparatus being secured to an anchorage of the aerial lift.

24. The aerial lift of claim 23 wherein the connector of the safety line of the fall-protection safety apparatus comprises a gated hook and wherein the safety harness comprises at least one D-ring with the gated hook connected thereto.

* * * * *